United States Patent
Stephens et al.

(10) Patent No.: US 7,680,714 B1
(45) Date of Patent: Mar. 16, 2010

(54) METHOD AND SYSTEM FOR DETERMINING, CONTRACTING TO EXCHANGE, AND ACCOUNTING FOR MATCHED SETS OF OFFSETTING CASH FLOWS

(76) Inventors: Garland Temple Stephens, 3012 Reba Dr., Houston, TX (US) 77019; Raj Daryanani, 409 Glenwood Dr., Briarcliff Manor, NY (US) 10510

( * ) Notice: Subject to any disclaimer, the term of this patent is extended or adjusted under 35 U.S.C. 154(b) by 934 days.

(21) Appl. No.: 11/389,918

(22) Filed: Mar. 27, 2006

Related U.S. Application Data

(62) Division of application No. 09/655,929, filed on Sep. 6, 2000.

(60) Provisional application No. 60/152,702, filed on Sep. 7, 1999.

(51) Int. Cl.
*G06Q 40/00* (2006.01)
(52) U.S. Cl. .......................... 705/35; 705/36 R; 705/37
(58) Field of Classification Search ................... 705/35, 705/36 R, 37
See application file for complete search history.

(56) References Cited

U.S. PATENT DOCUMENTS

| | | | |
|---|---|---|---|
| 5,077,655 A | 12/1991 | Silverman et al. | |
| 5,136,501 A | 8/1992 | Silverman et al. | |
| 5,375,055 A | 12/1994 | Togher et al. | |
| 6,014,643 A * | 1/2000 | Minton | 705/36 R |
| 6,044,361 A | 3/2000 | Kalagnanam | |
| 6,086,619 A | 7/2000 | Hausman | |
| 6,098,051 A * | 8/2000 | Lupien et al. | 705/36 R |
| 6,263,321 B1 | 7/2001 | Daughtery, III | |
| 6,304,858 B1 | 10/2001 | Mosler | |
| 6,317,727 B1 * | 11/2001 | May | 705/36 R |
| 6,341,266 B1 | 1/2002 | Braun | |
| 6,405,313 B1 | 6/2002 | Reiter | |
| 6,408,282 B1 * | 6/2002 | Buist | 705/36 R |
| 6,421,653 B1 | 7/2002 | May | |
| 6,456,982 B1 | 9/2002 | Pilipovic | |
| 6,594,624 B1 | 7/2003 | Curet | |
| 6,839,686 B1 | 1/2005 | Galant | |
| 7,039,919 B1 | 5/2006 | Hunt | |

OTHER PUBLICATIONS

U.S. Appl. No. 09/169,767, May.
U.S. Appl. No. 60/062,410, May.
U.S. Appl. No. 09/169,879, May.
Reddy, Securities Operations, 1995, pp. 213-254, New York, U.S.A.
Kapner, Marshall, The Swaps Handbook, 1990, pp. 3-543, New York, U.S.A.
Bazaraa, Jarvis, Sherali, Linear Programming and Network Flows, 1990, pp. 563-525, U.S.A.
Financial Accounting Standards Board, Statement of Financial Accounting Standards No. 133, Jun. 1998, pp. 5-123, Norwalk, CT, U.S.A.
island.com and linked pages, Oct. 12, 1999, downloaded from http://web.archive.org/web/1999101305008/http://island.com/.

* cited by examiner

*Primary Examiner*—Nga B. Nguyen
(74) *Attorney, Agent, or Firm*—Novak Druce + Quigg LLP

(57) ABSTRACT

One disclosed embodiment comprises a computerized method and system for matching structured cash flows by transmitting a information of an exchange definition comprising information of two or more underlyings, a notional amount or range, and a payment provision, and receiving information of a linear combination of one or more partial exchange definitions such that the net present value of the cumulative cash flow of the linear combination of partial exchange definitions is substantially zero.

17 Claims, 18 Drawing Sheets

Logical View

Logical View

| # | P/R | Underlying | Notional Amount | Settlement Date | Settlement Date Variance | Start Date | Start Date Variance | End Date | End Date Variance | Payment Period | Payment Period Variance | Min. Credit Rating | Credit Rating | Cal. |
|---|---|---|---|---|---|---|---|---|---|---|---|---|---|---|
| 1 | P | LIBOR 3M | 12M USD | 10/1/99 | (-30,30) | 10/15/99 | (-30,30) | 10/15/04 | (-30,30) | 3 Month | 0 | Aa | Aa | A/360 |
| 1 | R | UST5Y | 12M USD | 10/1/99 | (-30,30) | 10/15/99 | (-30,30) | 10/15/04 | (-30,30) | 3 Month | 0 | Aa | Aa | A/360 |
| 2 | P | UST10Y | 16M USD | 10/15/99 | (-30,30) | 11/1/99 | (-30,30) | 11/1/04 | (-30,30) | 3 Month | 0 | A | A | A/360 |
| 2 | R | LIBOR 3M | 16M USD | 10/15/99 | (-30,30) | 11/1/99 | (-30,30) | 11/1/04 | (-30,30) | 3 Month | 0 | A | A | A/360 |
| 3 | P | LIBOR 6M | 5M USD | 10/4/99 | (-15,15) | 11/11/99 | (-15,15) | 11/11/04 | (-15,15) | 6 Month | (-90,0) | A | AAA | A/360 |
| 3 | R | UST10Y | 5M USD | 10/4/99 | (-15,15) | 11/11/99 | (-15,15) | 11/11/04 | (-15,15) | 6 Month | (-90,0) | A | AAA | A/360 |
| 4 | P | LIBOR 12M | 7.5M USD | 10/1/99 | (-60,60) | 10/15/99 | (-60,60) | 10/15/04 | (-60,60) | 3 Month | (-60,0) | A | Aa | A/360 |
| 4 | R | UST10Y | 7.5M USD | 10/1/99 | (-60,60) | 10/15/99 | (-60,60) | 10/15/04 | (-60,60) | 3 Month | (-60,0) | A | Aa | A/360 |
| 5 | P | LIBOR 6M | 11M USD | 10/14/99 | (-30,0) | 10/15/99 | (-7,7) | 10/15/99 | (-7,7) | 3 Month | 0 | A | Aa | A/360 |
| 5 | R | UST1Y | 11M USD | 10/14/99 | (-30,0) | 10/15/99 | (-7,7) | 10/15/99 | (-7,7) | 3 Month | 0 | A | Aa | A/360 |
| 6 | P | UST5Y | 12.5M USD | 10/1/99 | (-30,30) | 10/15/99 | (-30,30) | 10/15/04 | (-30,30) | 3 Month | 0 | A | Aa | A/360 |

Fig. 10

| | | | | | | | | | | |
|---|---|---|---|---|---|---|---|---|---|---|
| 6 | R | LIBOR 6M | 12.5M USD | 10/1/99 | (-30,30) | 10/15/99 | (-30,30) | 10/15/04 | 3 Month | 0 | A | Aa | A/360 |
| 7 | P | LIBOR 3M | 5M USD | 1/1/00 | (-30,30) | 1/15/00 | (-30,30) | 1/15/00 | 3 Month | 0 | Aa | Aa | A/360 |
| 7 | R | UST5Y | 5M USD | 1/1/00 | (-30,30) | 1/15/00 | (-30,30) | 1/15/00 | 3 Month | 0 | Aa | Aa | A/360 |
| 8 | P | UST5Y | 10M USD | 1/15/00 | (-30,30) | 2/1/00 | (-30,30) | 2/1/00 | 3 Month | 0 | Aa | Aa | A/360 |
| 8 | R | LIBOR 3M | 10M USD | 1/15/00 | (-30,30) | 2/1/00 | (-30,30) | 2/1/00 | 3 Month | 0 | Aa | Aa | A/360 |
| 9 | P | UST1Y | 10M USD | 10/14/99 | (-30,0) | 10/15/99 | (-7,7) | 10/15/99 | 3 Month | 0 | A | Aa | A/360 |
| 9 | R | LIBOR 12M | 10M USD | 10/14/99 | (-30,0) | 10/15/99 | (-7,7) | 10/15/99 | 3 Month | 0 | A | Aa | A/360 |

Fig. 10 Cont.

Step 0

Step 6 Iteration 1

Step 6 Iteration 2

METHOD AND SYSTEM FOR DETERMINING, CONTRACTING TO EXCHANGE, AND ACCOUNTING FOR MATCHED SETS OF OFFSETTING CASH FLOWS

This application is a division of U.S. application Ser. No. 09/655,929, entitled "Method And System For Determining, Contracting To Exchange, And Accounting For Matched Sets Of Cash Flows," filed Sep. 6, 2000. This application claims priority to U.S. provisional patent application Ser. No. 60/152,702 filed Sep. 7, 1999, entitled METHOD AND SYSTEM FOR DETERMINING, CONTRACTING TO EXCHANGE, AND ACCOUNTING FOR MATCHED SETS OF OFFSETTING CASH FLOWS, which is incorporated by reference.

FIELD

The present invention relates to the field of electronic systems for locating counterparties and clearing markets for exchange of structured cash flows.

BACKGROUND

It is frequently desirable for parties to exchange cash flow streams having different term structures or risk profiles but similar net present values. Three examples of such exchanges are known in the financial industry as interest rate swaps, currency swaps and commodity swaps.

In one common interest rate swap transaction, a first party agrees to pay to a second party a fixed rate of interest for a certain period on a given sum in exchange for receiving from the second party a floating rate of interest on the same sum (the "notional amount") for the same period. Market practice is for one party to pay the other the net of the two interest payments on each payment date. Such a transaction is known as a "fixed-for-floating" swap. In most cases, the notional amount need not be exchanged.

In a common currency swap transaction, a first party exchanges a given sum in a first currency for the same sum in a second currency from a second party. For a certain period, the second party pays a first rate of interest on the given sum in the first currency to the first party, and the first party pays a second rate of interest on the given sum in the second currency to the second party. At the end of the period, the sum is re-exchanged at the original exchange rate. In practice, only the difference in the amounts adjusted for exchange rates need be exchanged.

In a common commodity swap transaction, a first party agrees to pay to a second party a fixed price per unit for a given number of units of a commodity (such as oil, electricity, corn or telecommunications capacity) per period over a certain number of periods in exchange for receiving from the second party a market price (determined by previously established means) per unit for the same number of units per period and periods. Again, market practice is for the parties to exchange the net of the two payments on each payment date, and the commodity itself need not be exchanged.

More generally, such transactions typically may be characterized by one or more underlyings (two in the swap examples above), a notional amount, and a payment provision. An underlying is a specified interest rate, security price, commodity price, foreign exchange rate, index of prices or rates, or other variable. A notional amount is a number of currency units, shares, bushels, pounds, or other units specified in the contract of exchange. Settlement is determined by interaction of the notional amount with the underlying, which may be multiplication, or a more complex formula. A payment provision specifies a fixed or determinable settlement to be made if the underlying behaves in a specified manner. These and related terms as used herein are intended to be consistent with Accounting for Derivative Instruments and Hedging Activities, Statement of Financial Accounting Standards No. 133 (Financial Accounting Standards Board, 1998) ("FASB 133").

By means of such exchanges of cash flows, parties may apportion and exchange risks, such as the risk of interest rate change, currency valuation change or commodity market price change.

Certain types of such exchanges, such as relatively short-term exchanges and/or those for which one party pays a lump sum, may be relatively easier to market than more complex exchanges. Some, including futures and options, are sufficiently standardized to be traded on market exchanges. Others, such as those for which both parties have structured payment terms and/or those with relatively longer terms (including swaps such as interest rate, currency and commodity swaps), are typically custom-brokered arrangements.

For example, in the past parties seeking counterparties for a swap transaction have found it necessary to use swap facilitators, in part due to very significant search costs associated with finding potential counterparties who have matching needs. See, e.g. Kapner, et al., The Swaps Handbook, p. 27, et seq. Investment banks, commercial banks, merchant banks, and independent broker/dealers traditionally have fulfilled the role of swap facilitators as swap brokers or dealers, taking for their efforts a commission or pricing differential between amounts bid and asked for particular transactions. It has been difficult or impossible for a party seeking a swap to locate a suitable counterparty without incurring the costs of such facilitators.

In many instances, facilitators of swap and other relatively complex exchanges have acted as a counterparty in transactions when they have been unable to locate exactly matching counterparties for a desired transaction. In such instances, it has been difficult for facilitators to ensure that their own positions with respect to one or more such exchanges (typically a portfolio) are hedged in a fully effective manner.

The present invention is directed to overcoming these and other limitations of existing methods and systems for facilitating exchange of structured cash flows by permitting counterparty-seeking parties to locate and deal directly with each other, while preserving many of the benefits formerly achieved only through intermediation by a third-party swap facilitator, and creating new benefits for market participants. The present invention is also directed to assisting third-party facilitators to more effectively intermediate exchanges of structured cash flows and act as counterparties in transactions while ensuring that the facilitators' positions with respect to such exchanges are fully and/or effectively hedged.

SUMMARY

In one aspect, the present invention comprises a system for determining a linear combination of structured cash flow exchanges having a net present value of substantially zero comprising: a digital information storage medium, the medium further comprising data representing processor instructions that operate on data representing a graph and produce data representing the maximum flow for the graph.

In another aspect, the present invention comprises a system for determining a linear combination of structured cash flow exchanges having a net present value of substantially zero comprising a digital information storage medium, the medium further comprising data representing processor instructions that operate on data representing a graph and produce data representing the minimum cut of the graph.

The present invention further comprises a system for determining a linear combination of transactions, comprising a digital information storage medium, the medium further comprising data representing processor instructions for:

(A) adding a node representing a selected transaction to a graph;

(B) for each node in the graph:
   querying a transaction repository for each matching transaction that is a partial match for the requirements of the transaction represented by the node;
   adding nodes representing each matching transaction to a graph;
   adding a directed arc from the node to each node representing another transaction that is a partial match for the requirements of the transaction represented by the node;

(C) repeating steps A and B until the graph contains nodes representing every transaction in the transaction repository that is a partial match for the requirements of a transaction represented by a node in the graph (D) determining the maximum flow on the graph.

In another aspect, the present invention comprises a method for matching structured cash flows for exchange comprising: receiving a first exchange definition; retrieving from a 10 database of one or more exchangedefinitions a plurality of exchange definitions comprising underlyings compatible with the first exchange definition, each exchange definition of the plurality comprising two or more underlyings, one or more notional amounts or notional ranges, and one or more payment provisions; determining a linear combination of partial exchange definitions such that the net present value of the cumulative cash flow of the linear combination of partial exchange definitions is substantially zero, each partial exchange definition comprising a fraction of a notional amount of the exchange definition ranging from zero to one; transmitting to each party that proposed an exchange definition of the linear combination information indicating the fraction of the party's exchange definition that comprises a partial exchange definition of the linear combination.

In still another aspect, the present invention further comprises method for matching structured cash flows described above, wherein the parties that exchange definitions comprising the linear combination are not identified to each other. The system further comprises the steps of: providing information of the linear combination of transactions to at least one creditworthy party; receiving an acknowledgment that the at least one creditworthy party is willing to act as counterparty in each partial transaction of the combination. The invention further comprises the method described above, wherein information of the linear combination of transactions is provided to a plurality of creditworthy parties, and further comprising the step of: receiving from each creditworthy party information of the amount that the creditworthy party would charge $0 act as a counterparty in each partial transaction of the combination.

In addition, the invention comprises the above methods wherein the information of the amount that the creditworthy party would charge to act as a counterparty in each partial transaction of the combination comprises information of an amount specific to each party. In the above method, the first transaction may represent an interest-bearing asset or liability and the combined notional amount of the combination of exchanges may match the principal amount of the interest-bearing asset or liability. Further, one formula for computing net settlements may be used for each net settlement. In addition, the interest bearing asset or liability may be not prepayable.

In another aspect, the present invention comprises a method for determining a set of offsetting structured cash flows for exchange, comprising: establishing in one or more memories a data structure corresponding to a transaction graph for a collection of exchange definitions; the transaction graph having edges between exchange definitions having at least partially compatible terms; the at least partially compatible terms including at least one of: an underlying, a start date, an end date, a variance; determining a linear combination of edges corresponding to a maximum notional amount for the graph with respect to one or more exchange definitions.

In yet another aspect, the present invention comprises a method for determining a structured cash flow exchange, comprising the steps of: receiving from a first party one or more electronic signals, the signals specifying a first transaction; storing information of the exchange definition in a database; receiving from a second party one or more electronic signals, the signals specifying a proposed second transaction, each exchange definition comprising two or more underlyings, a notional amount or range, and a payment provision; based on the proposed second transaction, querying the database; receiving from the database information of one or more transactions comprising underlyings compatible with the exchange definition; transmitting to the party at least a portion of the information of one or more transactions comprising underlyings compatible with the exchange definition, wherein the information transmitted to the party does not include the identity of at least one other party.

In another aspect, the invention comprises a system for contracting to exchange structured cash flows comprising: a database comprising a plurality of exchange definitions, each exchange definition comprising: an indication of a first underlying, an indication of a second underlying, an indication of a notional amount; an indication of a payment provision defining cash flows to be paid or received with respect to the notional amount and underlyings; a transaction monitor providing atomicity, consistency, integrity and durability; a query system for searching the database for exchange definitions comprising specified underlyings. In response to a query, the query system preferably returns information sufficient for a user to communicate anonymously with the parties whose exchange definitions comprise the specified underlyings, but not sufficient to reveal the identities of those parties.

In another aspect, the invention comprises a system for determining an exchange of structured cash flows, comprising: digital memory programmed to further comprise: an abstract object class corresponding to a generic underlying; a plurality of subclasses of the first object class, each subclass corresponding to a particular underlying.

In yet another aspect, the invention comprises a method for matching structured cash flows for exchange comprising: transmitting a first exchange definition; receiving a linear combination of one or more partial exchange definitions such that the net present value of the cumulative cash flow of the linear combination of partial exchange definitions is substantially zero, each partial exchange definition comprising a fraction of a notional amount of the exchange definition ranging from zero to one; communicating to each party that proposed an exchange definition of the combination information indicating the fraction of the party's exchange definition that comprises a partial exchange definition of the combination, without identifying the parties to each other. In addition, the method preferably further comprises the steps of: providing information of the linear combination of transactions to at least one creditworthy party; receiving an acknowledgment that the at least one creditworthy party is willing to act as counterparty in each partial transaction of the combination. Information of the linear combination of transactions preferably is provided to a plurality of creditworthy parties, and the method preferably further comprise the step of: receiving from each creditworthy party information of the amount that the creditworthy party would charge to act as a counterparty in each partial transaction of the combination. The information of the amount that the creditworthy party would charge to act as a counterparty in each partial transaction of the combination preferably comprises information of an amount specific to each party. The first transaction preferably represents an interest-bearing asset or liability and the combined notional amount of the combination of exchanges matches the principal amount of the interest-bearing asset or liability.

Further, preferably one formula for computing net settlements is used for each net settlement. And preferably the interest-bearing asset or liability is not prepayable.

In another aspect, the invention comprises a method for determining a structured cash flow exchange, comprising the steps of: transmitting one or more electronic signals, the signals specifying a first exchange definition comprising two or more underlyings, a notional amount or range, and a payment provision; receiving one or more electronic signals specifying one or more exchange definitions comprising underlyings compatible with the first exchange definition, and information sufficient to communicate with the parties proposing the one or more exchange definitions without revealing the identity the parties proposing the one or more exchange definitions.

DESCRIPTION OF FIGURES

FIG. 10 describes the transactions from which the transaction graph of FIG. 9 is generated.

DESCRIPTION

The present invention comprises an electronic system for locating matching sets of cash flows specified by two or more parties, and assisting the parties to execute binding obligations to exchange cash flows. Using the system, a party (the "user" below) seeking to enter into an agreement to exchange cash flows with one or more counterparties may locate one or more potential counterparties seeking partially or exactly matching cash flows, evaluate whether to proceed with a transaction with the one or more potential counterparties, and consummate a binding transaction. Payments are preferably made directly between the parties or through a paying agent. The system provides payment calculation and notification if desired.

In another aspect, the present invention comprises an electronic system through which two or more users agree to enter into matched obligations with a creditworthy third party. In such circumstances, the creditworthy third party becomes the counterparty of each user, and the users need never be identified to each other. Because the users obligations are matched, the creditworthy third party is hedged effectively in the transaction.

In another aspect, the present invention comprises an electronic system through which two or more users enter into matched obligations to each other contingent upon assumption of counterparty risk by a creditworthy third party. Such an assumption may occur with the third party as subrogee, surety, guarantor, or through any other transfer of rights and obligations. Thus the creditworthy third party may act as a counterparty, guarantor or insurer of the users.

In a further aspect, the invention comprises a method and system through which one or more entities contemplating an exchange of cash flows may determine whether transactions available to the one or more entities may be combined to fully and/or effectively hedge the exchange.

Figure 1:
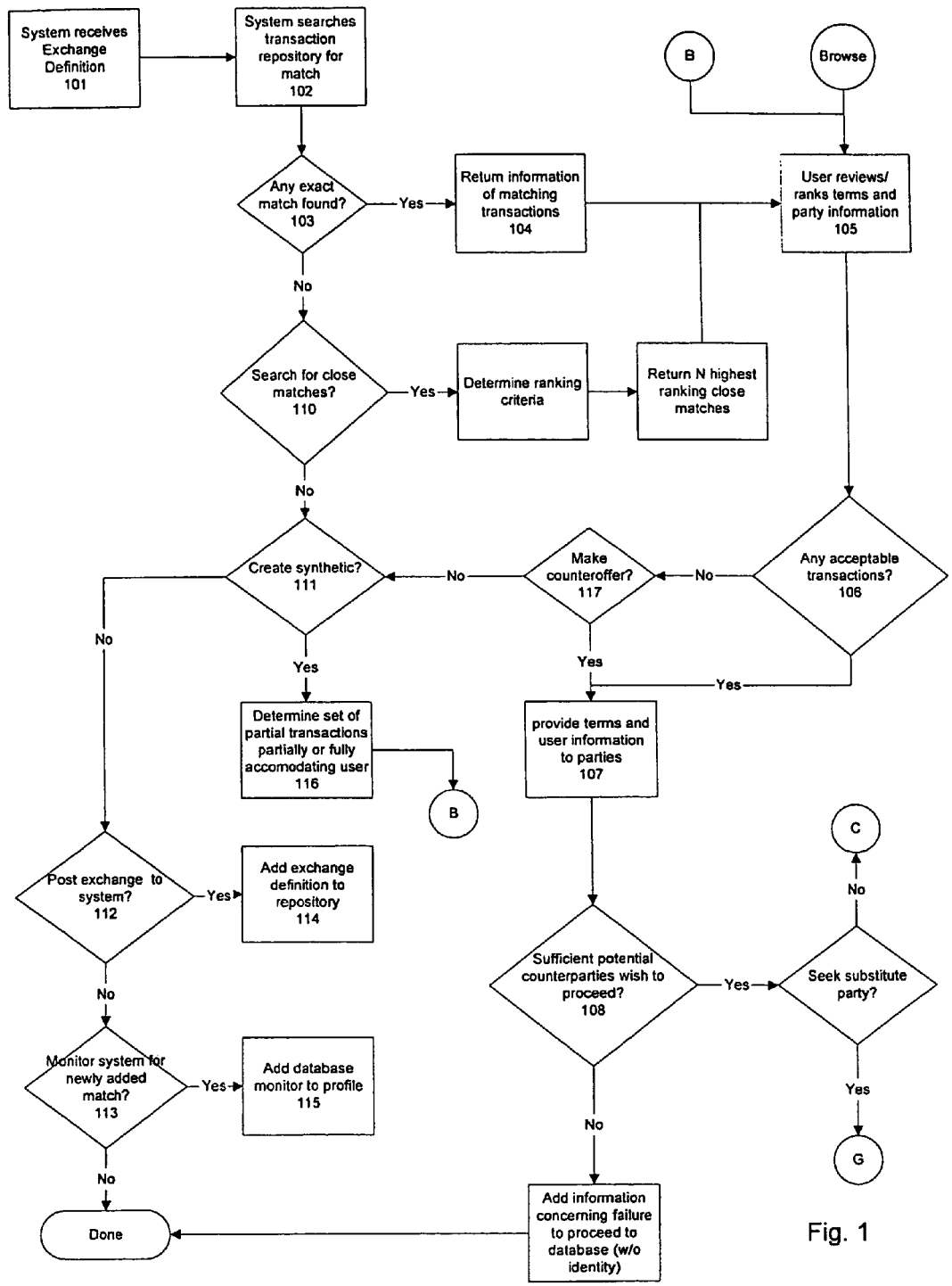
FIG. 1 is a flow chart schematically illustrating system function in an example preferred embodiment.
Figure 2:
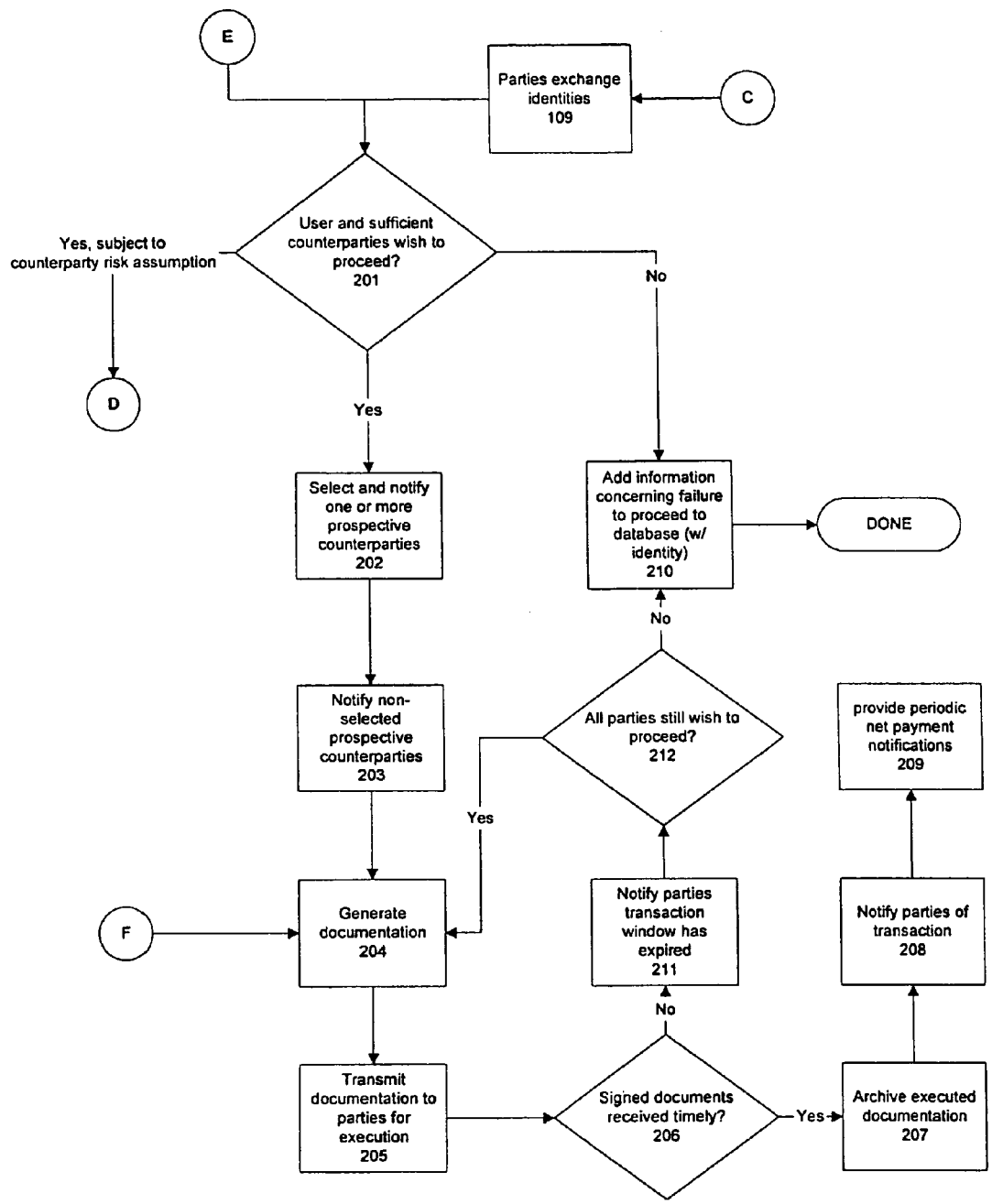
FIG. 2 is a flow chart schematically illustrating system function in an example preferred embodiment.

FIGS. 1 and 2 show a flow chart schematically illustrating an example preferred embodiment. Referring to FIG. 1 at 101, the system receives an exchange definition from the user, partially or fully defining the cash flows the user seeks to pay and receive.

In a preferred embodiment, an exchange definition specifies at least an underlying, a notional amount, and a payment provision. In addition, an exchange definition preferably specifies the units (e.g., currency) of the notional amount. Payment provisions preferably include cash flow definitions defining each cash flow to be paid or received with respect to the notional amount and underlying, and a schedule comprising a settlement date, start date, end date, and payment period, and a day count (e.g., actual or 30-day months and actual or 360-day years).

In a preferred transactional embodiment, an exchange definition also preferably specifies an acceptance provision. An acceptance provision specifies conditions under which the user that specified the exchange definition will enter into an exchange specified by the exchange definition. A preferred acceptance provision specifies a minimum credit rating for potential counterparties, maximum acceptable variances for payment and settlement schedules, an expiration date before which a prospective counterparty must consummate a transaction, and flags indicating whether the user wishes the transaction to be conditional upon insurance, guarantee, substitution, subrogation or other assumption of obligations by a creditworthy third party. Other information specified by the acceptance provision may include an indication of whether price sensitivity or time sensitivity is of higher priority (e.g., whether the highest bidder, or first to meet requirements is preferred).

Figure 3:
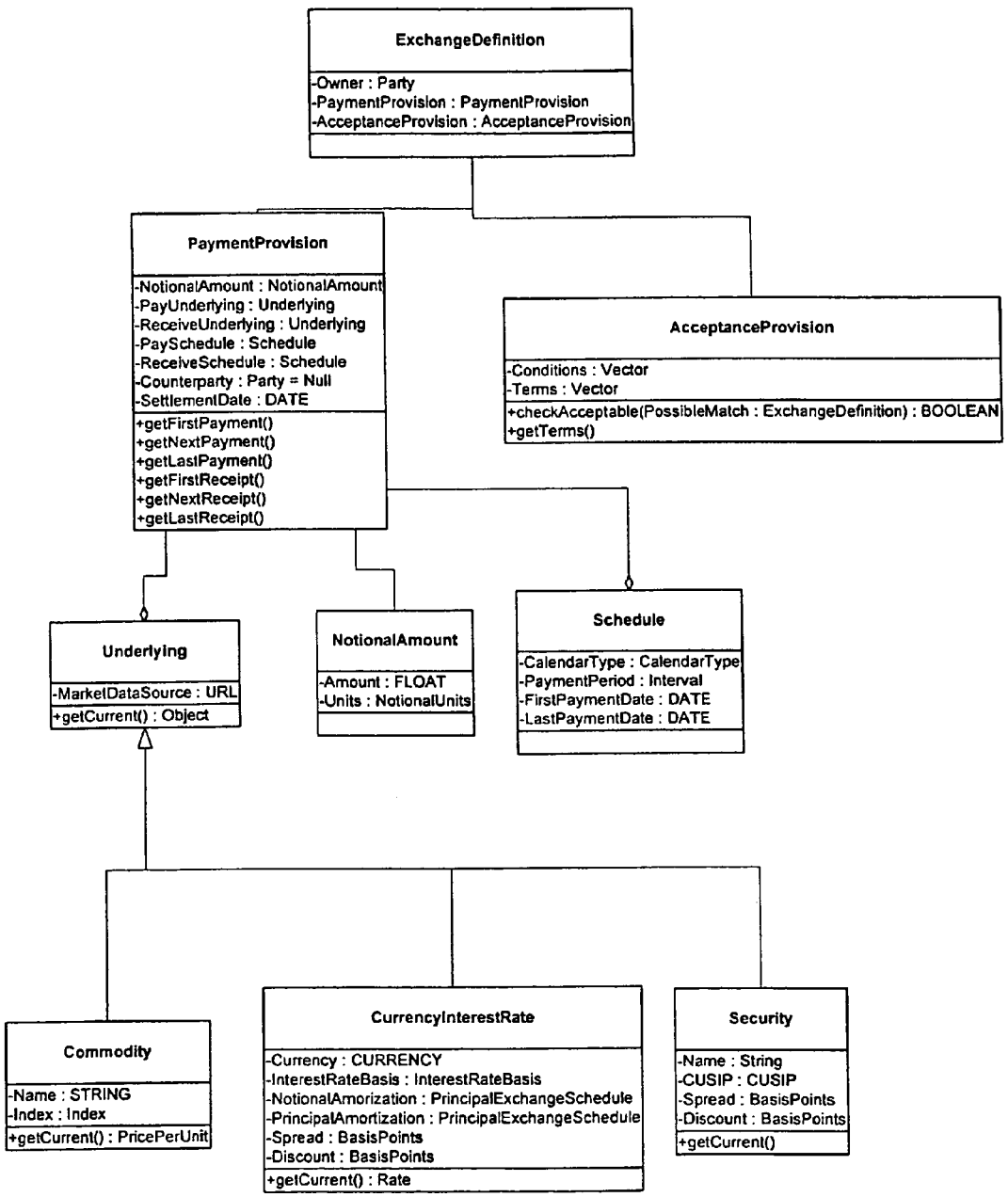
FIG. 3 is a simplified schematic illustration of an example preferred exchange definition for a transactional embodiment in Universal Modeling Language (UML) in FIGS. 3 and 4.
Figure 4:
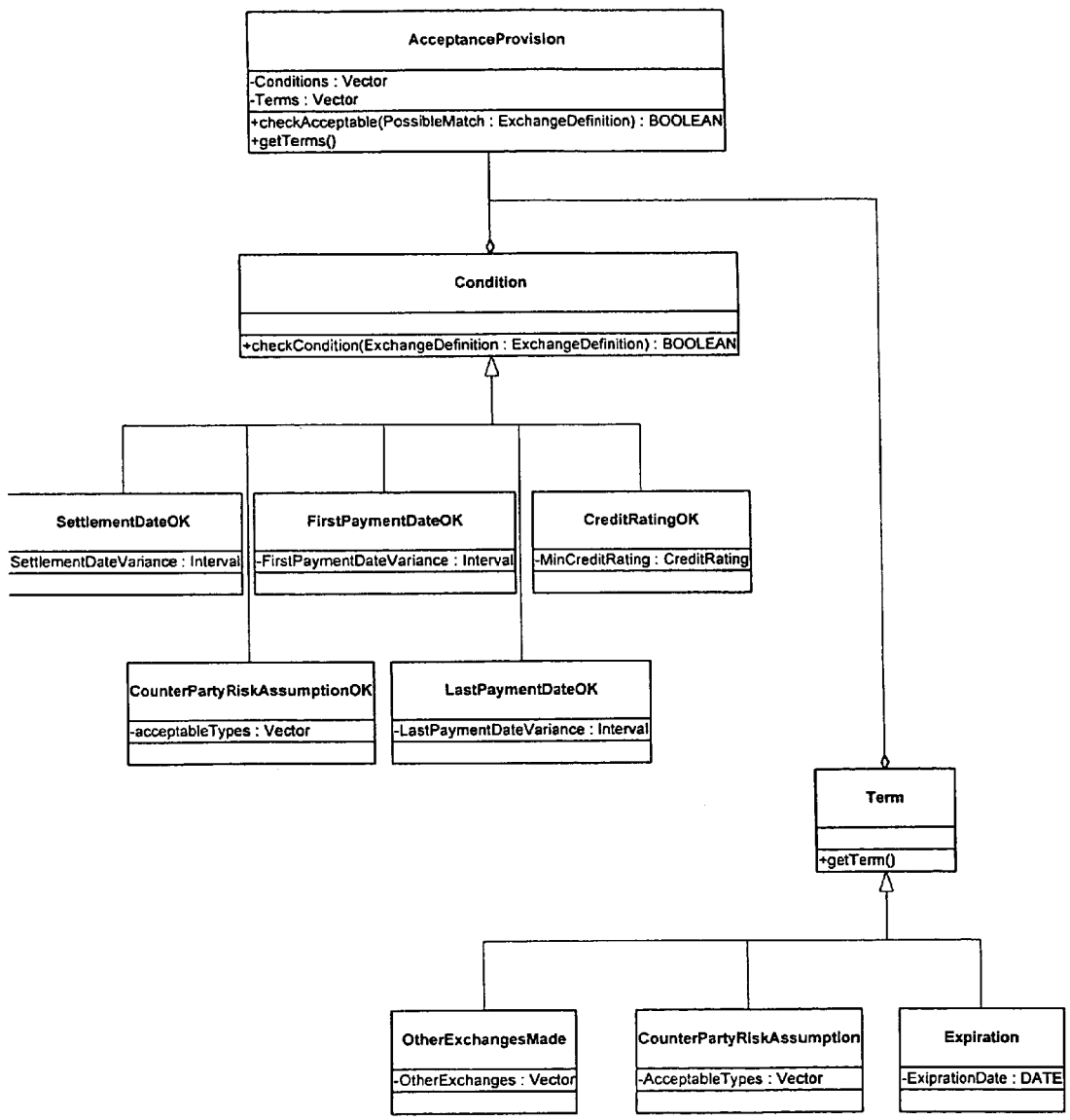
FIG. 4 is a simplified schematic illustration of an example preferred acceptance provision component of an exchange definition for a transactional embodiment in Universal Modeling Language (UML) in FIGS. 3 and 4.

A simplified example preferred exchange definition for a transactional embodiment is schematically illustrated in Unified Modeling Language (UML) in FIGS. 3 and 4. Methods and fields unnecessary to the present description, such as accessor methods for the fields shown, are omitted.

FIG. 3 schematically illustrates in UML, a simplified class diagram for an exchange definition. An exchange definition in accordance with the example is specified by an instance of the ExchangeDefinition Class. Each instance of the ExchangeDefinition class is associated with an instance of the Party class specified by the Owner field, an instance of the PaymentProvision class specified by the PaymentProvision field, and an instance of the AcceptanceProvision class specified by the AcceptanceProvision field. The Party object specified by the Owner field indicates the party responsible for the exchange definition, typically the same party that specified the definition.

In this example preferred embodiment, the payment provision is specified by an instance of the PaymentProvision class. The example PaymentProvision class class comprises a NotionalAmount field specifying an instance of the NotionalAmount class, a PayUnderlying field specifying an instance of the Underlying class, a ReceiveUnderlying field specifying an instance of the Underlying class, a PaySchedule field specifying an instance of the Schedule class, a ReceiveSchedule field specifying an instance of the Schedule class, a Counterparty field specifying an instance of the Party class (and having a default of null), and a SettlementDate field specifying an instance of the DATE class. The PaymentProvision also has a number of methods used to determine the dates and amounts of the first, next and last payments and receipts as shown in FIG. 3.

The Underlying class in the example preferred embodiment schematically illustrated in FIG. 3 is an abstract class, intended to be implemented by instances of concrete subclasses more closely related to particular categories of underlying. Two such concrete subclasses are shown, the Commodity class and the CurrencyInterestRate class. These classes may be further subclassed, or may delegate operations specific to subcategories of underlying (e.g. corn or telecommunications capacity) to associated classes. Instances of the Underlying class include a value for the MarketDataSource that is a Universal Resource Locator for current values of the underlying, and a getCurrent method for use in retrieving values of the underlying necessary for cash flow calculations.

The Commodity subclass of the Underlying class schematically illustrated in FIG. 3 includes a Name field for specifying the name of the commodity, and an Index field for specifying a particular source or measure of current value information for the commodity, and a getCurrent method overriding the getCurrent method of the parent class for retrieving the current price per unit for the commodity.

The CurrencyInterestRate subclass of the Underlying class schematically illustrated in FIG. 3 includes a Currency field for specifying the currency (e.g. U.S. Dollars) of the underlying, an InterestRateBasis field for specifying the interest rate basis for the underlying (e.g. U.S. Treasury 5 Year Bonds or London Interbank Offer Rate 3 month), a NotionalAmortization field for specifying a schedule for amortizing the notional amount (e.g., bullet, sinking fund or mortgage-type amortization), a PrincipalAmortization field for specifying a schedule for actual exchange of principal (e.g. no actual exchange for a typical interest rate swap, a bullet exchange of the full notional amount for a typical currency swap), a spread for specifying an amount above or below the current value of the interest rate basis specified by InterestRateBasis at which payments will be calculated, and a Discount field for specifying a discount from the notional amount of the underlying (e.g. for zero coupon bond type exchanges). The getCurrent method returns the current value of the interest rate basis specified by InterestRateBasis.

The Security subclass of the Underlying class schematically illustrated in FIG. 3 is used to specify an arbitrary security as an underlying. The Security class includes a Name field for specifying the name of the security, a CUSIP field for specifying the CUSIP number of the security, a spread for specifying an amount above or below the value of the security at which payments will be calculated, and a Discount field for specifying a discount from the notional amount of the underlying. The getCurrent method returns the current value of the security specified by the Security class In this example preferred embodiment, an instance of the NotionalAmount class is associated with an instance of the ExchangeDefinition class through an instance of the PaymentProvision class. The instance of the NotionalAmount class used to specify the notional amount for the transaction specified by the ExchangeDefinition. The NotionalAmount class includes an Amount field for specifying the notional amount, and a Units field for specifying the units in which the Amount field is specified.

Instances of the Schedule class are used to specify the schedule for payments to and from the Owner of the ExchangeDefinition. The Schedule class includes a CalendarType field for specifying the type of calendar used for the schedule (e.g, 30 day months and 360 day years, actual months and 360 day years or actual months and actual years). The schedule also includes a PaymentPeriod field for specifying the length of time between payments in accordance with the schedule. First and last payment dates are respectively specified by the FirstPaymentDate and LastPaymentDate fields of an instance of the Schedule class.

In the example preferred embodiment schematically illustrated in FIG. 3, an acceptance provision is specified by an instance of the AcceptanceProvision class. The AcceptanceProvision class includes a Conditions field that specifies zero or more conditions that must be fulfilled for a transaction in accordance with the ExchangeDefinition to be acceptable to the user that specified the ExchangeDefinition. The AcceptanceProvision class includes a checkAcceptable method for determining whether a particular ExchangeDefinition meets the conditions specified by an instance of the AcceptanceProvision class. The AcceptanceProvision class also includes a Terms field that specifies zero or more terms of the transaction, and a getTerms method for retrieving the terms associated with an instance of the AcceptanceProvision class.

The AcceptanceProvision class of this example preferred embodiment is schematically illustrated in further detail in FIG. 4. Zero or more instances of the Condition class are specified by the Conditions field of the AcceptanceProvision class, and zero or more instances of the Term class are specified by the Terms field of the AcceptanceProvision class.

The Condition class of the example preferred embodiment is an abstract base class intended to be implemented by one or more concrete subclasses to produce classes for specifying particular categories of conditions that must be fulfilled for a transaction to be acceptable in accordance with an ExchangeDefinition object. The Condition class includes a checkCondition method that should be implemented in any concrete subclass. The checkCondition method may be used to determine if a particular ExchangeDefinition object meets the condition specified by an instance of the Condition class. Five example subclasses of the Condition class are schematically illustrated in FIG. 4: SettlementDateOK, FirstPaymentDateOK, LastPaymentDateOK, CreditRatingOK, CounterpartyRiskAssumptionOK.

The SettlementDateOK subclass of the Condition class is used to determine if an ExchangeDefinition specifies an acceptable settlement date. A settlement date is acceptable if it falls with in an interval specified by the SettlementDateVariance field of the SettlementDateOK class. The interval may be absolute (e.g. beginning Oct. 1, 1999 and ending Oct. 31, 1999) or relative to the settlement date specified in the Schedule associated with the ExchangeDefinition with which the SettlementDateOK instance is assocated. The FirstPaymentDateOK and LastPaymentDateOK classes function similarly to the SettlementDateOK class.

The CreditRatingOK subclass of the Condition class is used to determine if an ExchangeDefinition specifies an Owner having an acceptable credit rating. A credit rating is acceptable if it equals or exceeds the credit rating specified by the MinCreditRating field of the CreditRatingOK class.

The CounterpartyRiskAssumptionOK subclass of the Condition class is used to determine if an ExchangeDefinition specifies an acceptable form of counterparty risk assumption. A form of counterparty risk assumption is acceptable if it is listed in the acceptableTypes field of the CounterpartyRiskAssumptionOK class.

The Term class of the example preferred embodiment is an abstract base class intended to be implemented by one or more concrete subclasses to produce classes for specifying particular categories of terms that must be met for a transaction to be acceptable in accordance with an ExchangeDefinition object. Three example subclasses of the Term class are schematically illustrated in FIG. 4: OtherExchangesMade, CounterPartyRiskAssumption, and Expiration.

The OtherExchangesMade subclass of the Term class is used to specify zero or more other ExchangeDefinition instances representing transactions which must be consummated at the same time as the transaction partially specified by the OtherExchangesMade instance. For example, if a party seeks to enter into an interest rate swap and a currency swap at the same time, but will not enter into either unless the other is consummated, an OtherExchangesMade instance specifying the interest rate swap ExchangeDefinition will be associated with the ExchangeDefinition of the currency swap, and vice versa.

The CounterpartyRiskAssumption subclass of the Term class is used to specify zero or more acceptable forms of counterparty risk assumption by a creditworthy third party.

The Expiration subclass of the Term class is used to specify a date after which the transaction specified by the ExchangeDefinition instance with which the Expiration instance is associated will no longer be available.

The example preferred embodiment uses instances of the ExchangeDefinition class to represent exchange definitions.

Referring to FIG. 1, at 102, the system searches one or more system transaction repositories for exchange definitions previously stored in the system for one or more exchange definitions partially or fully matching the requirements of the exchange definition of the user.

If one or more available exchange definitions partially or fully match the requirements of the user, the matching exchange definitions are returned in a result dataset to the user 104. In addition to exchange definition information, the dataset preferably includes additional descriptive information about the parties whose exchange definitions are included in the result dataset. Such descriptive information may include the credit rating, type of entity (e.g., financial institution, manufacturer, major dealer), location, number and/or dollar equivalent volume of transactions sought and/or completed using the system, the number of times that the party has requested the identity of a user without completing the associated transaction, and system alias (if any).

Preferably, the result dataset also includes sufficient information about the parties whose exchange definitions are included in the result dataset for users to communicate anonymously with parties whose exchange definitions are included in the dataset, but not sufficient information to reveal the identity of those parties. Thus, in a preferred embodiment, the system allows parties to make information available to users sufficient to identify transactions potentially meeting the users' requirements and to provide users with an indication of the parties' reliability in completing transactions and counterparty credit risk, all without revealing the parties' identities. A preferred embodiment also provides a facility for anonymous communication.

After receiving the dataset, the user reviews the dataset 105, preferably ranking the results in order of the relative desirability of the transactions described by the returned exchange definitions and associated information in the result dataset.

If the user determines that one or more of the transactions described in the result dataset are acceptable 106, the user causes the user's exchange definition and associated descriptive information to be communicated to the corresponding parties 107. In a preferred embodiment, the information communicated by the user to these potential counterparties mirrors the information provided to the user about the potential counterparties in the result dataset. Thus, the information provided by the user to potential counterparties is sufficient to allow the parties to communicate anonymously with the user, but is not sufficient to reveal the identify the user.

Like party information included in the result dataset received by the user, the system preferably provides additional information about the user to the potential counterparties. Such information may include the credit rating, type of entity (e.g., financial institution, manufacturer, major dealer), location, number and/or dollar equivalent volume of transactions sought and/or completed using the system, the number of times that the user has requested the identity of a counterparty without completing the associated transaction, and system alias (if any). Thus, in a preferred embodiment, the system allows users to make information available to potential counterparties sufficient provide potential counterparties with an indication of the user's reliability in completing transactions and credit risk, all without revealing the user's identity to the prospective counterparties.

After evaluating the information concerning a transaction from a user, one or more potential counterparties may respond in a timely manner indicating an intention to proceed towards completing a transaction with the user. The system determines whether sufficient counterparties to complete one or more (possibly alternative) transactions have indicated an intention to proceed at 108. If so, the identities of the user and the prospective counterparties in each possible transaction are revealed to the other prospective parties in that transaction 109. For example, in the case of a plurality of alternative counterparties for a two-party exchange, the identity of each counterparty is preferably revealed to the user, but not to the other alternative counterparties. If more parties are required for a particular possible transaction, the identities of the parties are revealed only to those necessary to the possible transaction, and not to parties necessary to another possible alternative transaction, unless the particular parties are necessary to both. In a preferred embodiment, identification of the parties to each other 109 is an atomic operation, so that no party's identity is revealed to another unless that party's identity also is revealed.

In a preferred embodiment, when the user and potential counterparties are identified to each other, additional information is also provided. The particular additional information revealed with identity may depend on the information provided earlier in the process. For example, if the credit rating of the parties was not made available earlier, the credit rating preferably is provided with the identity. In addition, detailed contact, payment address, and other information sufficient to permit the generation of transaction documentation for execution by the parties also preferably is exchanged.

Referring now to FIG. 2, after the user and prospective counterparties are identified to each other, each party may indicate a wish to proceed towards completing a transaction 201. Such an indication may indicate a conditional or unconditional intention to proceed. If an insufficient set of counterparties indicates an intention to proceed, the system stores information 210 concerning the identity of the parties that indicated a desire to proceed before the parties were identified to each other 108 but failed to proceed after 201.

If one or more sets of parties sufficient to complete a transaction indicate an unconditional intention to proceed, the user may select one or more sets of prospective counterparties to become actual counterparties in a completed transaction 202. The system notifies the selected counterparties of the user's wish to proceed toward completing the transaction 202 and also notifies non-selected prospective counterparties that the transaction will not be completed with them 203.

The system next generates documentation of the transaction from information provided by the parties and transaction documentation templates stored by the system 204. For example, in a typical swap transaction, template objects are used to populate electronic copies of International Swap Dealers Association (ISDA) standard swap agreements with all information necessary to prepare the documents for execution by the parties.

The generated transaction documentation is authenticated (e.g., digitally signed) by the system and transmitted to the user and the selected counterparties for execution 205. In a preferred embodiment, users and counterparties have previously agreed to accept and be bound by documentation executed by digital signature.

The parties are (or previously have been) informed of a time limit for receipt of executed transaction documentation. If complete executed transaction documentation is received by the system within the time limit, they are time-stamped, authenticated and permanently archived by the system 207 and the parties are notified that a binding obligation has been created 208 and provided with copies of the authenticated time-stamped executed documentation. Thereafter, at the option of the parties, the system may provide periodic notification of net payments due under the obligation 209. The exchange definitions are removed from the transaction repository.

If complete executed transaction documentation is not received within the time limit, the parties are notified that the time limit has expired without consummation of the transaction 211, and are given the opportunity to again attempt to consummate the transaction. If the parties indicate their intention to proceed 212, the system again generates documentation as before 204. Otherwise, the transaction is discontinued and information concerning the identity and failure of the party or parties that failed to timely submit transaction documentation is stored by the system 210.

Figure 5:
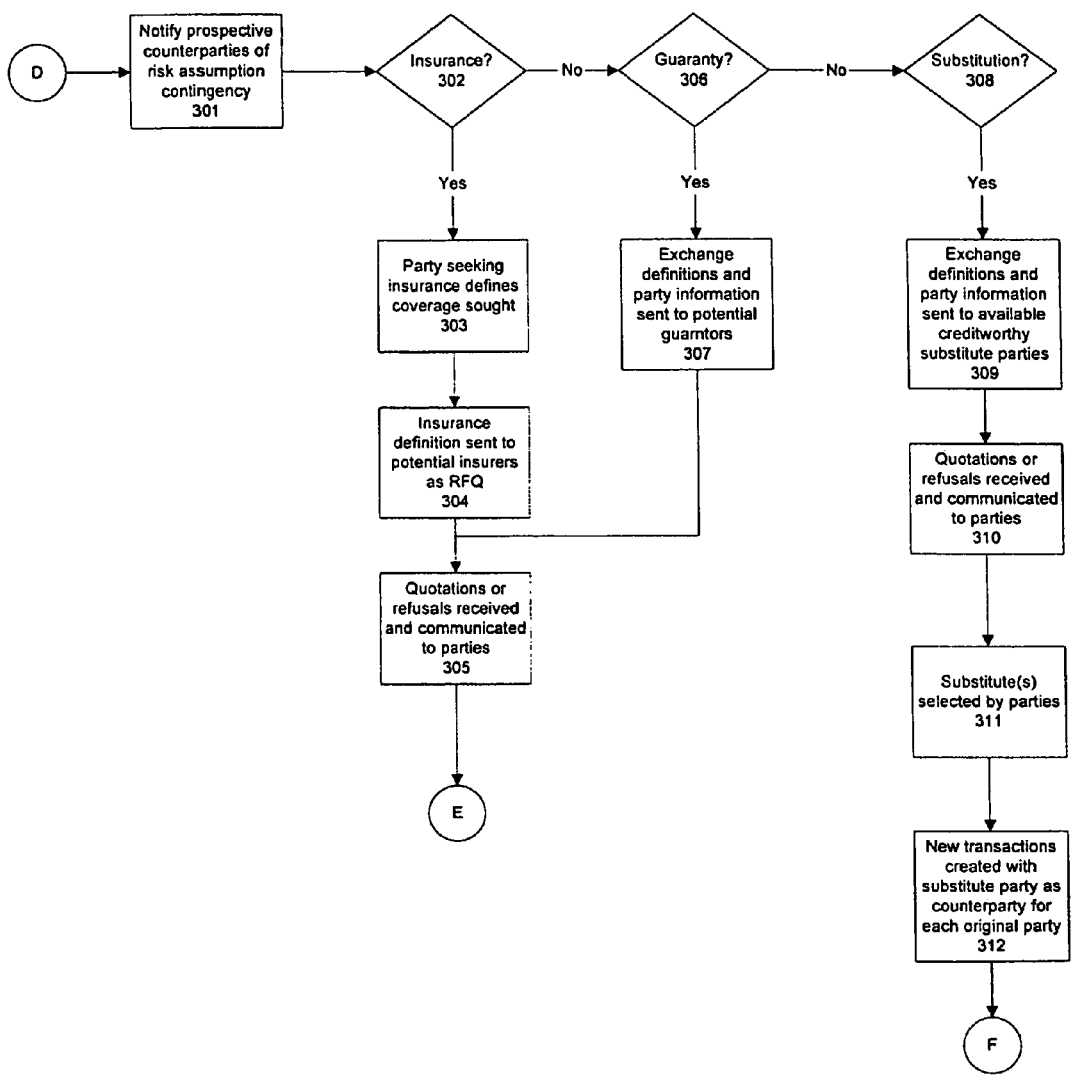
FIG. 5 is a flow chart schematically illustrating system function in an example preferred embodiment when a transaction is conditioned upon assumption of counterparty risk by a creditworthy entity.

If one or more sets of parties sufficient to complete a transaction indicate an intention to proceed conditioned upon assumption of counterparty risk by a creditworthy entity, the system proceeds as will be described with reference to FIG. 5. The condition of assumption of counterparty risk may be included in one or more exchange definitions as described above, or communicated by one or more parties after the user and prospective counterparties are identified to each other. When the condition is elected, the user and prospective counterparties are all notified by the system of the condition.

If the form of counterparty risk assumption sought is insurance 302, the party or parties seeking insurance define the insurance parameters (e.g., the policy amount) 303, and the insurance definition, exchange definitions and other party information is communicated to potential insurers as a request for quotation 304. Subsequently, quotations or refusals are received by the system 305 and communicated to the parties. The system then determines whether the user and counterparties intend to proceed 201 and the system proceeds as described above.

If the form of counterparty risk assumption sought is a guaranty of counterparty performance 306, the exchange definitions and other party information is communicated to potential guarantors 307. Subsequently, quotations or refusals are received by the system 305 and communicated to the parties. The system then determines whether the user and counterparties intend to proceed 201 and the system proceeds as described above.

If the form of counterparty risk assumption sought is a substitution of a creditworthy entity for the prospective counterparties 308, exchange definitions and party information are sent to available creditworthy substitute parties 309. In this form of counterparty risk assumption, the user and prospective counterparties consummate transactions directly with one or more creditworthy substitute parties, and not with each other. Preferably, a single creditworthy substitute party is used, and the substitute party becomes the counterparty for the user and each of the original prospective counterparties of the user. In this situation, the substitute party's transactions with the prospective counterparties taken together are a fully effective hedge for the substitute party's transaction with the user. Significant accounting benefits under FASB 133 may accrue to the substitute party as a result.

After quotations and/or refusals from creditworthy substitute parties are received and communicated to the user and prospective counterparties 310, the user and prospective counterparties select one or more substitute parties 311. New exchange definitions are generated by the system reflecting direct transactions between the user and the one or more substitute parties, and each prospective counterparty and the one or more substitute parties 312. The system then generates documentation for these transactions 204 and proceeds as described above.

Returning again to FIG. 1, the search 102 may not return an exact match. If not, additional search options are available to the user. These may be specified in a variety of ways by the user, and need not occur together, or in the order shown in FIG. 1. For example, in a preferred embodiment, a World Wide Web interface preferably is available and simultaneously may present options 110, 111, 112, and/or 113 to the user in the form of links or buttons. Similarly, the system may receive the exchange definition object in 101 in one or more XML, CORBA, DCOM or RMI message including additional fields specifying options 110, 111, 112 and/or 113.

Option 110 provides the user the ability to search for transactions similar, but not identical to, the transaction described by the exchange definition received by the system 101. Similarity of transactions for purposes of determining close matches preferably depends on search and/or ranking or metric criteria which may be established by the user, and/or system default criteria. For example, a user may establish that the transactions nearest in notional amount or other specified aspect (e.g., first payment date, last payment date or payment period), or combination of specified aspects be returned to the user. The user further may establish that, for example, only those transactions within ten percent (based on the established criteria) of the transaction described by the exchange definition received by the system are to be returned in a dataset. In another example, the user may establish that only the 20 most similar transactions based on the established criteria are to be returned.

A ranking or metric is preferably provided or derivable for exchange definition data types that otherwise are unquantified. For example, for purposes of similarity comparisons, fixed interest rates may be assigned a base numeric value of 0, and floating interest rates may be assigned a base numeric value of 10000. Added to these base values may be a numeric value of 0 for fixed Treasury interest rates, and 0 for LIBOR floating interest rates, and the number of months of the term of each interest rate. Thus, the 30-year Treasury Bond interest rate would have an associated numeric index of 360, and six-month LIBOR would have an associated numeric index of 10006. Nearly any index facilitating ranking or distance comparisons between different values of a data type (such as alphabetical ordering) may be substituted for this example.

After reviewing and/or ranking a set of close matches 105, the user determines if any transactions are acceptable 106. If so, then the user proceeds as described above by providing terms and user information to parties who have specified acceptable transactions 107. If not, the user may determine whether to make a counteroffer to one of the transactions described in the result dataset 114. If the user determines to make a counteroffer, the user creates a new exchange definition or edits one from the result dataset, selects parties from the result dataset to receive the counteroffer, and provides the counteroffer information and additional user information to the selected potential counterparties 107.

Another option available to users is to post an exchange definition to the system 112. Posting an exchange definition causes the user's exchange definition to be added to the system transaction repository after which the exchange definition becomes available for searching by other users.

Another option available to users is to monitor the system for newly posted exchange definitions matching the user's exchange definition 113. When a new exchange definition matching the user's search definition is added to the system, the system causes the user to be notified. The user specifies whether to monitor exact matches for the exchange definition, or close matches.

Another option available to users is to request that the system attempt to synthesize an exchange matching the user's exchange definition by combining proposed exchanges available on the system. The system may be used to determine a collection of transactions that, taken together, form a closed set of obligations that offset each other. The method used by the system may be best explained with the aid of FIGS. 6-21. FIGS. 6-21 schematically depict transactions as nodes in a transaction graph. Each node is arbitrarily labeled for convenience with a unique number. Each node is connected with one or more arrows, referred to as directed arcs, to other nodes representing other transactions.

Figure 6:
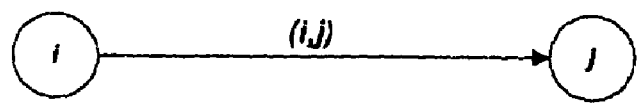
FIG. 6 illustrates an example directed arc.
Figure 7:
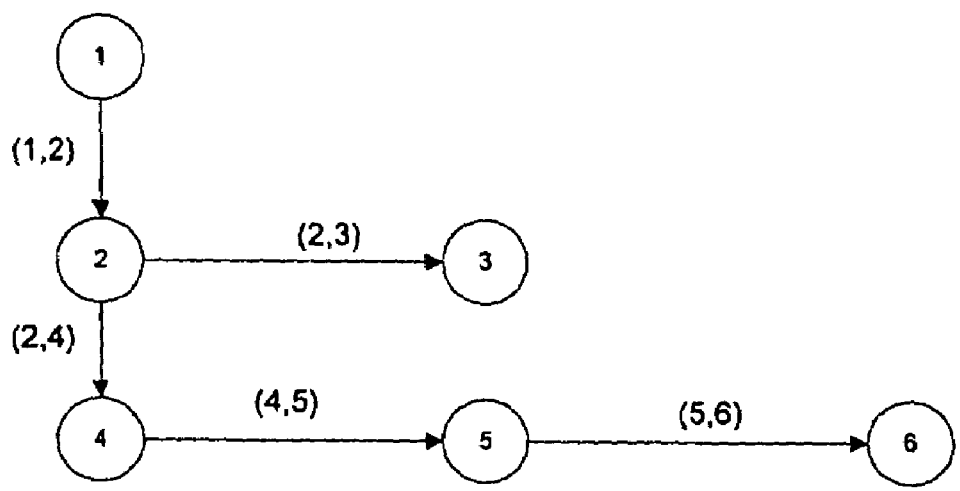
FIG. 7 illustrates paths in a graph.
Figure 8:
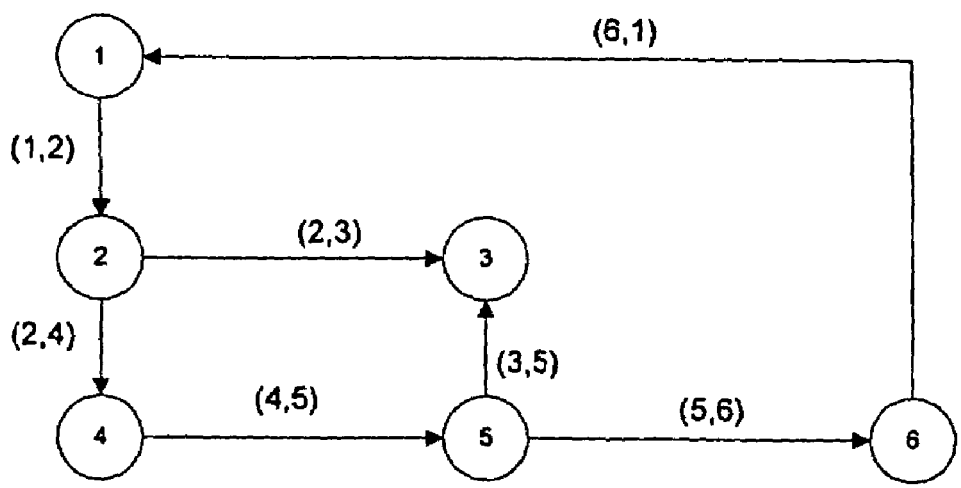
FIG. 8 illustrates circuits in a graph.

As shown in FIG. 6, a directed arc may be specified by the ordered pair (i,j) wherein i represents the number of the label of the node from which the directed arc points, and j represents the number of the label of the node to which the directed arc points. A "path" is a sequence of arcs $\{(i_0,i_1), (i_1,i_2), \ldots, (i_{p-1},i_p)\}$ in which the initial node of each arc is the same as the terminal node of each preceding arc in the sequence and $i_0, \ldots i_p$ are all distinct nodes. Each arc in the path is thus directed away from $i_0$ and toward $i_p$. For example FIG. 7 includes paths $\{(1,2), (2,3)\}$ and $\{(1,2), (2,4), (4,5), (5,6)\}$ and subpaths thereof. A "circuit" is a closed path; i.e. a path from some node $i_0$ to $i_p$ together with the arc $(i_p,i_0)$. FIG. 8 shows an example graph containing one circuit, $\{(1,2), (2,4), (4,5), (5,6), (6,1)\}$. The terminology used herein is intended to be consistent with that of Bazaraa, et al., Linear Programming and Network Flows (Wiley, 1990), which is incorporated herein by reference.

Figure 9:
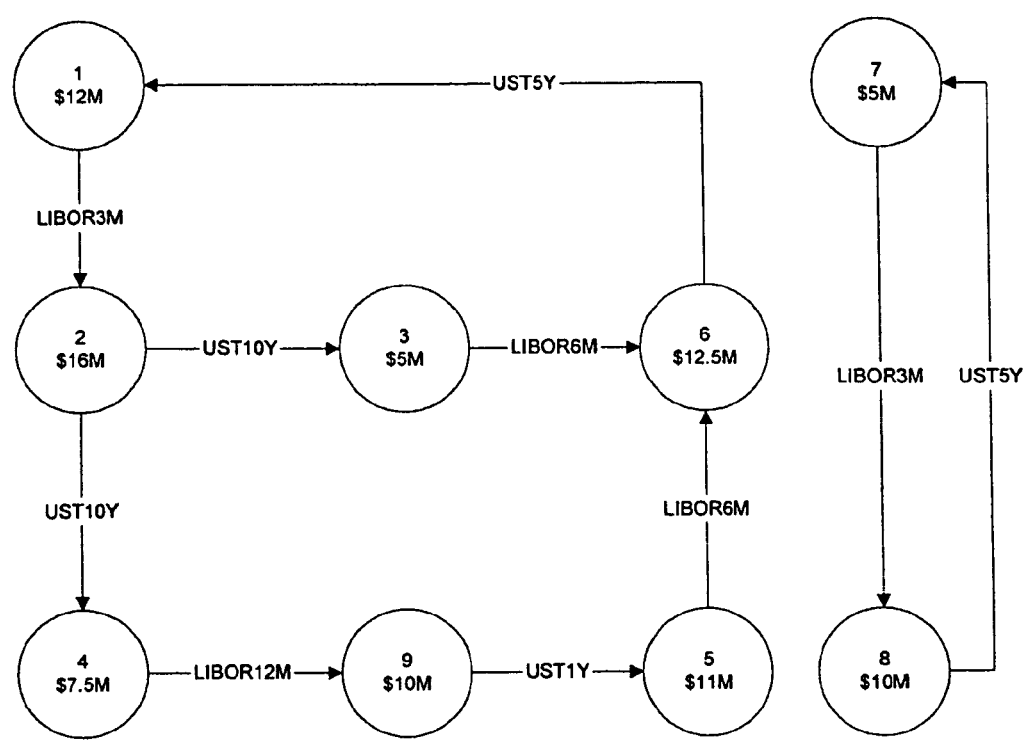
FIG. 9 illustrates a transaction graph.

Transactions available on the system of the present invention may be conceptualized as a transaction graph such as the example shown in FIG. 9. In such a transaction graph, a directed arc between a first node and a second node signifies that the second node represents a transaction that specifies receiving at least a portion of a cash flow that the transaction represented by the first node specifies paying.

A transaction graph may be constructed by adding a node for each transaction available on the system, and a directed arc from the node to each node representing another transaction that is a partial match for the requirements of the current transaction. For example, for a given node a directed arc may be added from the given node to each node representing another transaction that: (i) is of a counterparty meeting the minimum credit rating requirements of the current transaction; (ii) states a notional amount in the same units; (iii) specifies receiving a cash flow that is based on an underlying compatible with the underlying of the cash flow to be paid for the given node; (iv) is on a schedule (including start date, end date and settlement date) within acceptable variances of the current transaction.

The example transaction graph of FIG. 9 is generated from transactions described in more detail in FIG. 10. Each row of the table in FIG. 10 describes a cash flow to be paid or received for each node in FIG. 9. The numbers in the column labeled "#" of FIG. 10 correspond to the node numbers shown in the circular node representations of FIG. 9. The column labeled "P/R" indicates whether the row describes the cash flow to be paid (P) or received (R) by the corresponding transaction. The "Settlement Date Variance," "Start Date Variance," and "End Date Variance" columns indicate acceptable variances in days before and after the corresponding date. Thus, a settlement date variance of (−30,0) indicates that acceptable settlement dates may be up to 30 days prior to the specified date, but not later. The "Cal." column indicates whether days are counted on an actual month/actual year (A/A) basis, a 30 day month/360 day year (30/360) basis, or an actual month/360 day year (A/360) basis.

As shown in the FIG. 10, node 1 represents a transaction specifying a payment on an underlying of LIBOR 3 month interest rate and a notional amount of twelve million U.S. Dollars. The node 1 transaction specifies a settlement date within the period beginning 30 days prior to Oct. 1, 1999 and ending 30 days after Oct. 1, 1999, as indicated by the "Settlement Date" and "Settlement Date Variance" columns. The node 1 transaction also specifies a start date for payments within the period beginning 30 days prior to Oct. 15, 1999 and ending 30 days after Oct. 15, 1999, and an end date for payments within the period beginning 30 days prior to Oct. 15, 2004 and ending 30 days after Oct. 15, 2004. The payment period is specified as 3 months, with no acceptable variance. The node 1 transaction also specifies a minimum credit rating for a counterparty of Aa, and a credit rating for the party corresponding to the transaction represented by node 1 of Aa. The node 1 transaction also specifies an actual month/360 day year calendar, as indicated by "A/360" in the "Cal." column.

Of the other nodes listed in FIG. 10, only node 2 represents a transaction specifying a cash flow to be received that: (i) is of a counterparty meeting the minimum credit rating requirements of the current transaction; (ii) states a notional amount in the same units; (iii) specifies receiving a cash flow that is based on an underlying compatible with the underlying of the cash flow to be paid for the given node; (iv) is on a schedule (including start date, end date and settlement date) within acceptable variances of the current transaction. Thus a directed arc points from node 1 to node 2. Nodes 3, 4, 5, 6, 7 and 9 specify different underlyings than node 1, and node 8 specifies an incompatible schedule (as does node 7), so no directed arcs point from node 1 to those nodes. Similarly, as shown by the arcs in FIG. 9, only nodes 3 and 4 meet the partial requirements of node 2, only node 9 meets the partial requirements of node 4, only node 5 meets the partial requirements of node 9, node 6 meets the partial requirements of both nodes 5 and 3, and node 1 meets the partial requirements of node 6. Nodes 7 and node 8 are partial matches for each other.

Each circuit of FIG. 9 then represents a collection of transactions comprising cash flows that, taken together, at least partially offset each other. The maximum cash flow that may be offset by a circuit is determined by the minimum of the notional amounts specified by its nodes. Three circuits are contained in FIG. 9—{(1,2), (2,3), (3,6), (6,1)}, which has a maximum circuit cash flow of $5 million; {(1,2), (2,4), (4,9), (9,5), (5,6), (6,1)}, which has a maximum circuit cash flow of $7.5 million; and {(7,8), (8,7)} which has a maximum circuit cash flow of $5 million.

Under some circumstances a transaction graph constructed as described above will contain circuits that cannot be accommodated by a single schedule. This may be avoided by instead selecting a global schedule and adding only nodes to the transaction graph for transactions for which the global schedule is acceptable.

None of the circuits in FIG. 9 are alone sufficient to offset the full $12 million notional amount specified by node 1. However, a combination of the two circuits passing through node 1 can fully satisfy the $12 million notional amount specified by node 1. For example, by combining a $5 million notional amount over the circuit passing through node 3 with a $7 million notional amount over the circuit passing through node 4, the $12 million notional amount specified by node 1 may be achieved. Similarly, combining a $7.5 million notional amount over the circuit passing through node 4 with a $4.5 million notional amount over the circuit passing through node 3 will also accommodate the full $12 million notional amount specified by node 1. In this example, a continuum of intermediate solutions is also possible.

The question of whether, and to what degree, the notional amount specified by a selected node may be accommodated by a combination of swaps may be cast and solved as a maximal flow problem of linear programming by slight modification of the conceptualization schematically exemplified in FIG. 9. Further, the technique may be used to determine one or more combinations of available transactions that maximally accommodate the notional amount specified by the transaction represented by the selected node.

Figure 11:
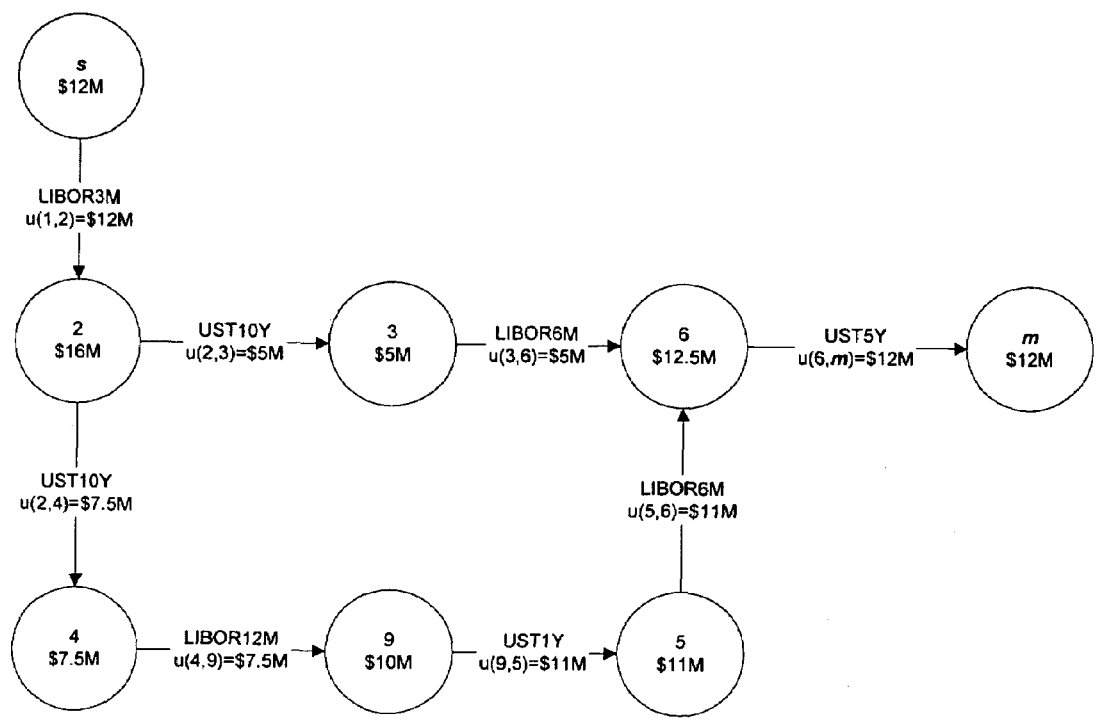
FIG. 11 schematically illustrates the transaction graph of FIG. 9 recast as a maximal flow problem.

In this conceptualization, the selected node 1 for which maximal accommodation is sought is regarded as comprising two separate nodes, a cash flow source s and a cash flow sink m. For each directed edge (l,j) in the original graph, the recast graph contains a directed edge (s,j), and for each directed edge (i,l) in the original graph, the recast graph contains a directed edge (i,m). FIG. 11 schematically illustrates the transaction graph of FIG. 9 recast in this form.

Each directed edge (i,j) is regarded as having an associated transactional capacity u(i,j) equal to the minimum of the notional amounts of nodes i and j. Each directed edge is further regarded as having an associated transactional amount x(i,j), representing an allocation of the cumulative notional amount of a combination of partial transactions of which the nodes i and j are a part. The transactional amount may be analogized to "flow" of a notional amount through the directed edge (i,j). The problem of determining a set of notional flows x(i,j) that maximize the notional flow from the source s to the sink m is equivalent to determining a set of offsetting partial swap transactions that maximizes the notional amount offset with respect to the node for which maximal accommodation is sought.

The maximal flow problem may be stated as follows:
maximize the flow f from s (or equivalently, to m)
subject to $$\sum_{j=1}^{m} x(i, j) - \sum_{k=1}^{m} x(k, i) = \{f \text{ if } i = s; 0 \text{ if } i \neq 1; -f \text{ if } i = m\}$$

$$x(i,j) \leq u(i,j)$$

$$x(i,j) \geq 0$$

where the sums and inequalities are taken over existing directed arcs in the graph.

The maximal flow problem may also be characterized in terms of cut sets separating node s from node m. If N represents the set of all nodes in the graph, X is any set of nodes in the graph containing node s but not node m, and Y=N−X, then the set of directed edges (X,Y)={(i,j) such that i is in X and j is in Y} is a cut-set separating node m from node s. The maximal flow from s to m over the transaction graph is no greater than the capacity of any cut-set separating node m from node s, that is, the sum of the transactional capacities u(i,j) of the directed edges in any cut-set separating node m from node s. Further, the maximal possible flow from s to m over the transaction graph is equal to the minimum capacity of any cut-set separating s from m, known as a min-cut.

Excluding edges (s,2) and (6,m), the example shown in FIG. 11 contains 2 min-cuts: {(2,3), (2,4)} and {(3,6), (4,9)}. The maximal flow for the graph of FIG. 11 is thus u(2,3)+u(2,4)=u(3,6)+u(4,9)=$12.5 million. Since this capacity exceeds the notional amount of $12 million specified by the selected node, there exists one or more sets of notional flows meeting the requirements of the transaction of the selected node.

Having thus specified the problem, any of a number of linear programming methods may be applied to find one or more feasible sets of notional flows maximizing the accommodation of a selected node in a transactional graph. The resulting set of flows x(i,j) represent the notional amounts of partial transactions between the counterparties corresponding to the nodes of the graph. Together these partial transactions accommodate the notional amount of transaction specified by the selected node to the maximum degree possible given the set of transactions used to generate the graph. Possible methods include the simplex method, the dual simplex method, the out-of-kilter algorithm, and others. However, methods specifically adapted to network flow problems are preferred, and result in substantially faster performance.

In a system containing representations of a large number of transactions, and particularly in such a system when parallel activities may cause the unavailability of particular transactions on an ongoing basis, it may be inconvenient or impractical to generate a complete transaction graph for the transactions available on the system. In a preferred embodiment, the system uses a method to find the maximal notional flow for a selected node that does not require generation of a complete transaction graph. Such a method is described below.

In one preferred method, a partial transactional graph G is constructed sequentially by initially adding the selected node, then repeatedly querying a system transaction repository for transactions partially matching transactions represented by nodes already present in the graph. A tag is associated with each node. The tag for a node j has the form $t(j)=(+/-, i, d(j))$ where d(j) indicates the amount of flow that can be sent to node j from node s through the current graph with given flows without violating transactional capacity constraints. The +/−entry may take the values + or −, and together with the entry i indicates the previous node in the chain along which flow can be changed. A +i entry indicates flow will be added to directed arc (i,j) and a −i entry indicates that flow will be subtracted from arc (j,i).

The preferred method comprises the following steps:

(0)—Add node s to the partial graph G, to the set NOARC (1)—Erase all tags (i.e. set t(i)=null for all nodes i in G).

(2)—For each node i in NOARC:

(a) query the repository for all nodes $j_1, \ldots j_n$ representing transactions that specify receiving cash flows that partially match the cash flow payment specified by the transaction represented by node i;

(b) remove node i from NOARC;

(c) add nodes to $j_1, \ldots j_n$ and NOARC and directed edges $(i,j_1) \ldots (i,j_n)$ to G.

(3)—Set t(s)=(−,infinity).

(4)—If node i has a tag (i.e. t(i) is not null), node j has no tag (i.e. t(j) is null), and x(i,j)<u(i,j), then set t(i,j)=(+i, d(j)) where d(j)=Minimum(d(i), u(i,j)−x(i,j)). If node i has a tag and node j has no tag, and x(j,i)>0, then set t(i,j)=(−i, d(j)) where d(j)=Minimum(d(i), x(j,i)).

(5)—Repeat step (4) until either node m has a tag or until no more nodes can be tagged.

(6)—If node m is not tagged; and NOARC is empty, then DONE; if node m is not tagged and NOARC is not empty, go to step (2).

(7)—If node m is tagged, starting with node m as the current node:

(a)—if the tag of the current node i specifies the previous node in the chain as +k, add add d(m) to x(k,i);

(1)—if the tag of the current node i specifies the previous node in the chain as −k, then subtract d(m) from x(i,k);

(2)—make node k the current node and repeat these steps until node s is reached.

(8) Return to step 1.

Application of the example preferred embodiment to the transactions described in FIG. 10 with node 1 as the selected node are schematically illustrated in FIGS. 12-20.

Figure 12:
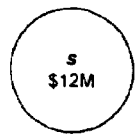
FIG. 12 schematically illustrates the results of step 0 of an example preferred embodiment.

In FIG. 12, the results of step 0 are shown. The selected node has been represented as nodes s and m and node s has been added to the graph G and the set NOARC.

Figure 13:
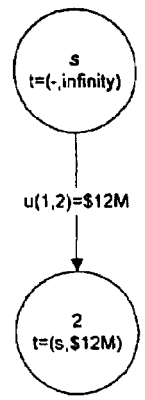
FIG. 13 schematically illustrates the results of the first iteration through step 6 of an example preferred embodiment.

In FIG. 13, the results of the first iteration of the method through step 6 are shown. In step 2, the system transaction repository was been queried for all transactions that specify receiving cash flows that partially match the cash flow payment specified by the transaction represented by the nodes in NOARC (node s). Specifically, the system transaction repository was queried for any transaction specifying a cash flow to be received that: (i) is of a counterparty meeting the minimum credit rating requirements of the node 1 transaction; (ii) states a notional amount in the same units; (iii) specifies receiving a cash flow that is based on an underlying compatible with the underlying of the cash flow to be paid for the node 1 transaction; (iv) is on a schedule (including start date, end date and settlement date) within acceptable variances of the node 1 transaction. Only the transaction represented by node 2 was returned. Node s was removed from NOARC and node 2 placed in NOARC. Node 2 and directed edge (s,2) were added to G and u(s,2) was established as the minimum of the notional amounts specified by nodes s and 2, that is, $12 million.

Figure 14:
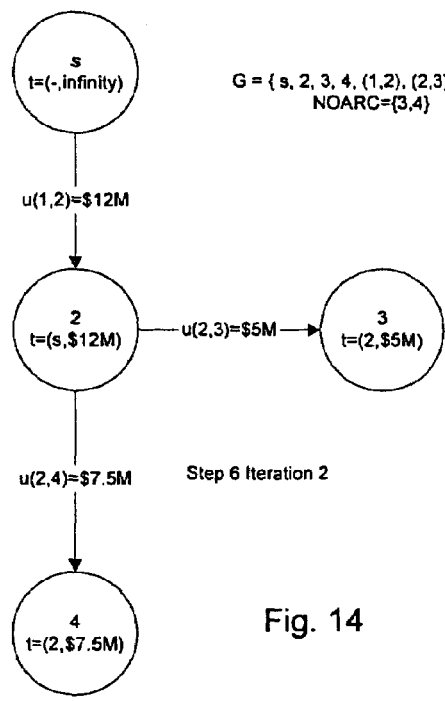
FIG. 14 schematically illustrates the results of the second iteration through step 6 of an example preferred embodiment.

Again referring to FIG. 13, the tag for node s was set to (−,infinity) in step 3, and since x(s, 2)=0 at this point, the tag for node 2 was set to (+s, d(2)) where d(2)=Minimum(d(s), u(s,2)−x(s,2))=Minimum(infinity,$12M−0)=$12M FIG. 14 schematically illustrates the results of the second iteration through step 6. In step 2, the system transaction repository was again queried for all transactions that specify receiving cash flows that partially match the cash flow payment specified by the transaction represented by the nodes in NOARC (node 2). Nodes 3 and 4 were returned. Nodes 3 and 4 and edges (2,3) and (3,4) were added to G, and the transactional capacities of the edges were established as before as u(2,3)=$5M and u(2,4)=$7.5M. Also as above, t(3) is determined to be (+2,d(3)) where d(3)=Minimum(d(2), u(2,3)−x(2,3))=Minimum($12M, $5M−0)=$5M. Similarly d(4) is determined to be (+2,$7.5M).

Figure 15:
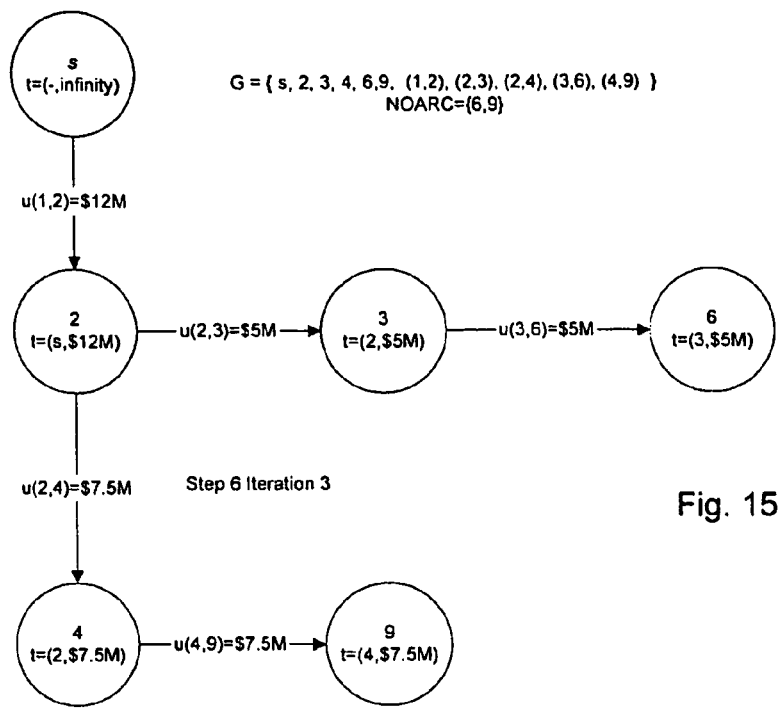
FIG. 15 schematically illustrates the results of the third iteration through step 6 of an example preferred embodiment.
Figure 16:
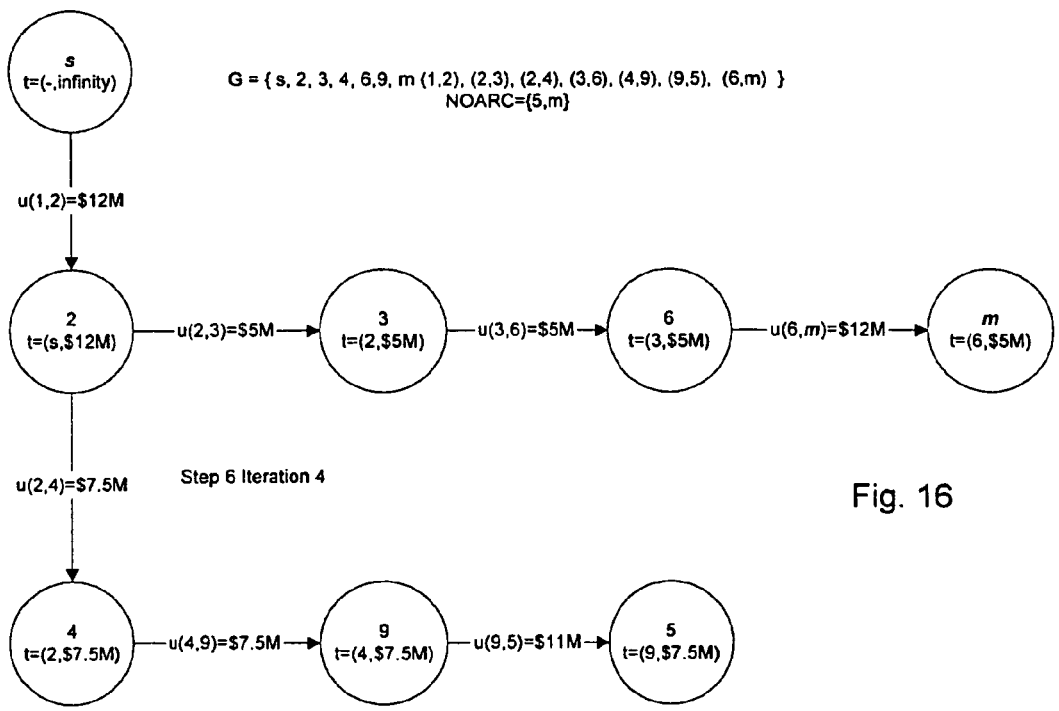
FIG. 16 schematically illustrates the results of the fourth iteration through step 6 of an example preferred embodiment.

FIG. 15 illustrates the third iteration through step 6, and FIG. 16 illustrates the fourth iteration through step 6. The analyses are similar to those of FIGS. 13 and 14.

Figure 17:
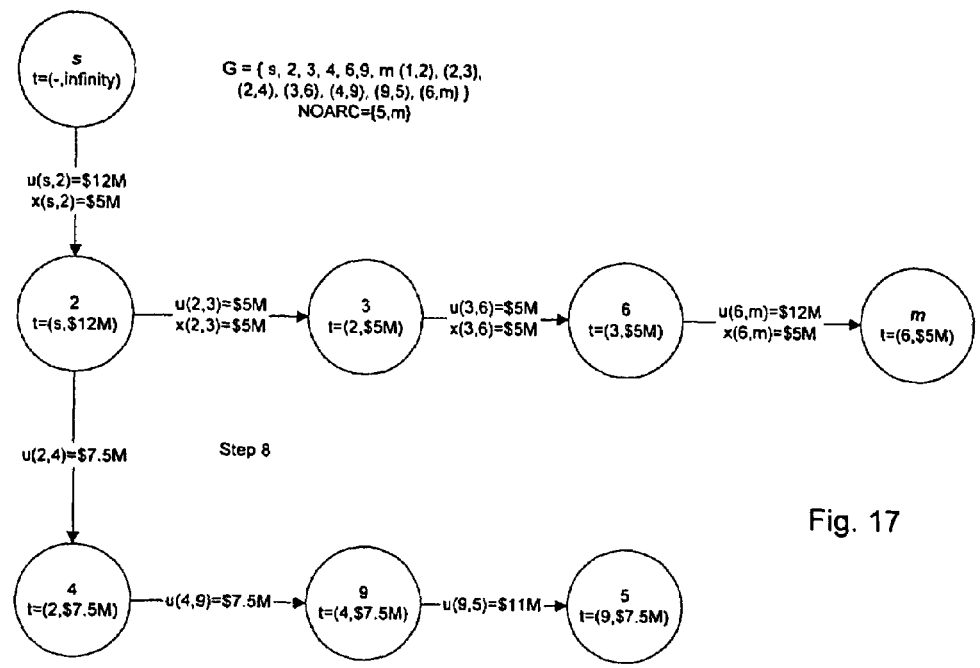
FIG. 17 schematically illustrates the results of the first iteration through step 8 of an example preferred embodiment.

Since node m was tagged when step 6, iteration 4 was reached, as shown in FIG. 16, steps 7 and 8 are executed by the system after the fourth iteration of step 6. The results are illustrated in FIG. 17. As shown in FIG. 17, d(m)=$5M. Chaining backwards through the tagged nodes, the flows x(6,m), x(3,6), x(2,3) and x(s,2) are incremented by $5M. Since these flows were zero prior to this step, the result is a $5M value for each flow.

Figure 18:
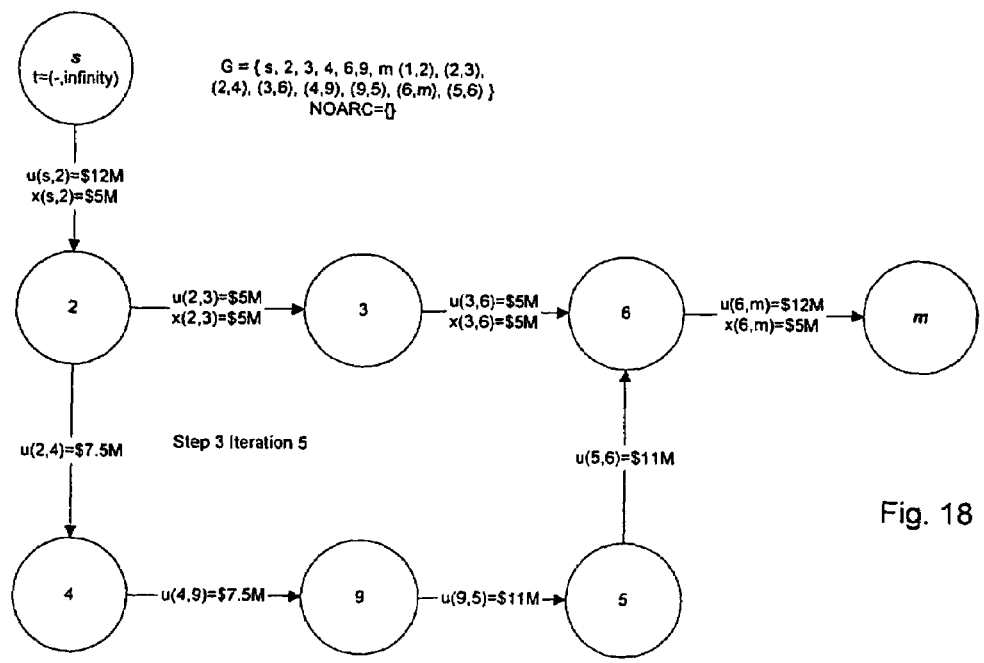
FIG. 18 schematically illustrates the results of the fifth iteration through step 3 of an example preferred embodiment.

The results of the fifth iteration through step 3 are schematically illustrated in FIG. 18. The tags of all nodes have been erased, and again the system transaction repository is searched for transactions partially matching transactions represented by nodes in NOARC. Only node 6 is returned. Since node 6 is already in G, only the directed arc (5,6) is added to G.

Figure 19:
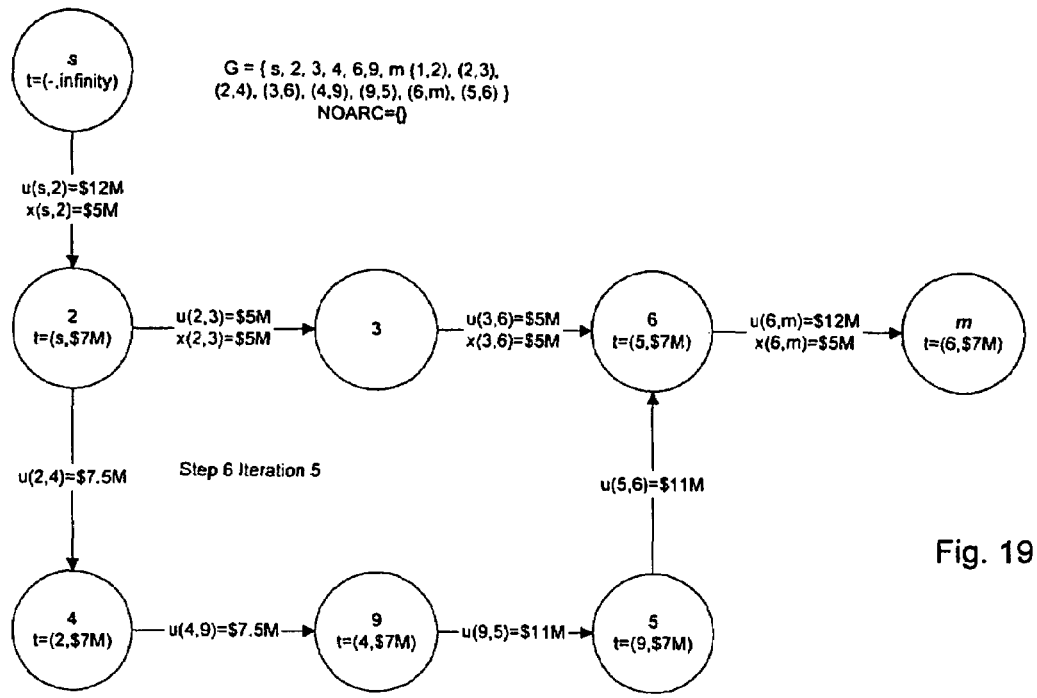
FIG. 19 schematically illustrates the results of the fifth iteration through step 6 of an example preferred embodiment.

The results of the fifth iteration through step 6 are schematically illustrated in FIG. 19. Since x(2,3)=u(2,3), node 3 is not tagged. As described above, tags are set as shown in the figure for nodes 2, 4, 5, 6, 9, m.

Figure 20:
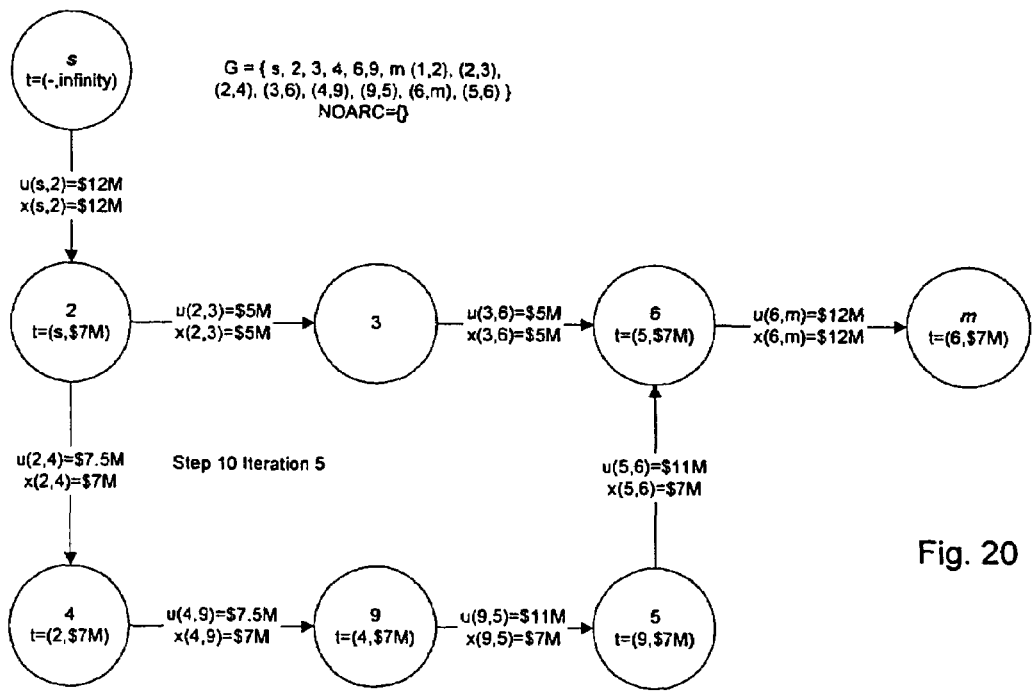
FIG. 20 schematically illustrates the results of the fifth iteration through step 10 of an example preferred embodiment.

Since node m was tagged when step 6, iteration 5 was reached, as shown in FIG. 19, steps 7 and 8 are again executed by the system after the fifth iteration of step 6. The results at step 10 are illustrated in FIG. 20. As shown in FIG. 20, d(m)=$7M. Chaining backwards through the tagged nodes, the flows x(6,m), x(5,6), x(9,5), x(4,9), x(2,4) and x(s,2) are incremented by $7M. Since flows x(6,m) and x(s,2) had values of $5M prior to this step, the result is a $12M value for flows x(6,m) and x(s,2). Since flows x(5,6), x(9,5), x(4,9) and x(2,4) were zero prior to this step, the result is a $7M value for each of these flows.

Figure 21:
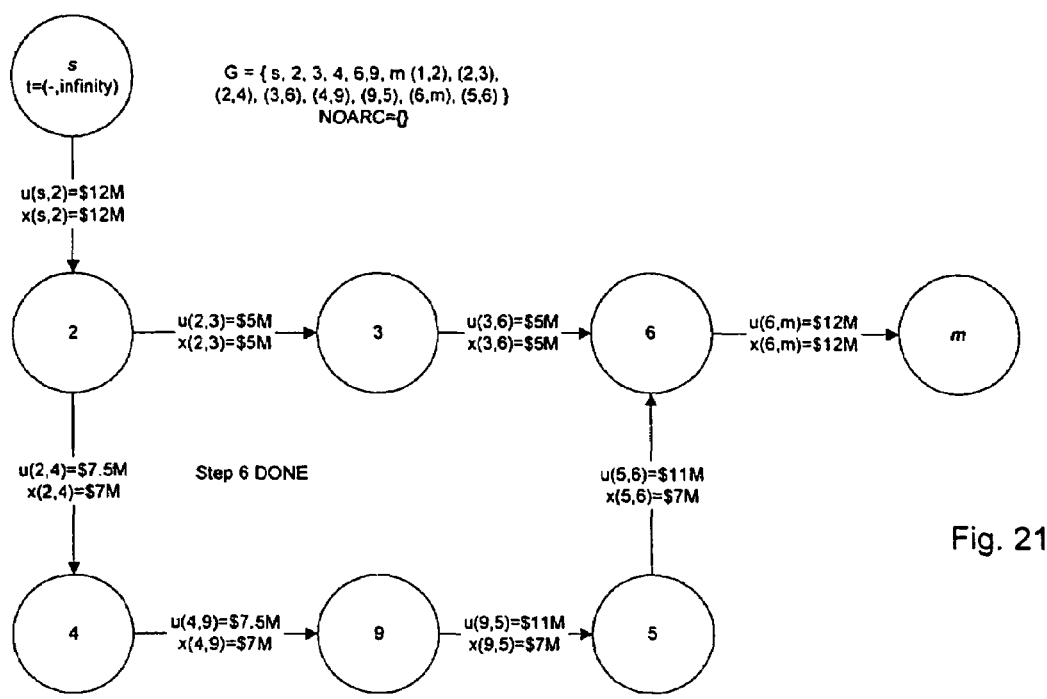
FIG. 21 schematically illustrates the results at step 6 at the conclusion of an example preferred embodiment.

FIG. 21 shows the results of the sixth and final iteration through step 6. Since x(s,2)=u(s,2), only node s is tagged. Since node m is not tagged, and NOARC is empty, the method terminates. Note that (s,2) is a min-cut for G, and for the transactional graph of FIG. 11. When the method terminates, the set (L,L') where L is the set of tagged nodes and L' is G−L is a min-cut.

The foregoing method may be applied to a transaction graph constructed with or without the selection of a global schedule as described above. If applied without a global schedule, circuits for which no single schedule is acceptable may be avoided by adding the following step to the method described above as follows.

(2) (d) truncate the schedule variances of the transactions represented by nodes $j_1, \ldots j_n$ to exclude any portions not compatible with the schedule definition of node i.

Thus, for example, when adding node 2 to G, the schedule definition of transaction 2 in FIG. 10 would be truncated to a settlement date of Oct. 15, 1999 with an acceptable variance of (−30, 16), a start date of Nov. 1, 1999 with an acceptable variance of (−30, 13) and an end date of Nov. 1, 2004 with an acceptable variance of (−30,13). Since during each iteration nodes are added only for transactions specifying schedules compatible with those represented by nodes in NOARC, no circuits are formed for which no single schedule is acceptable.

Figure 22:
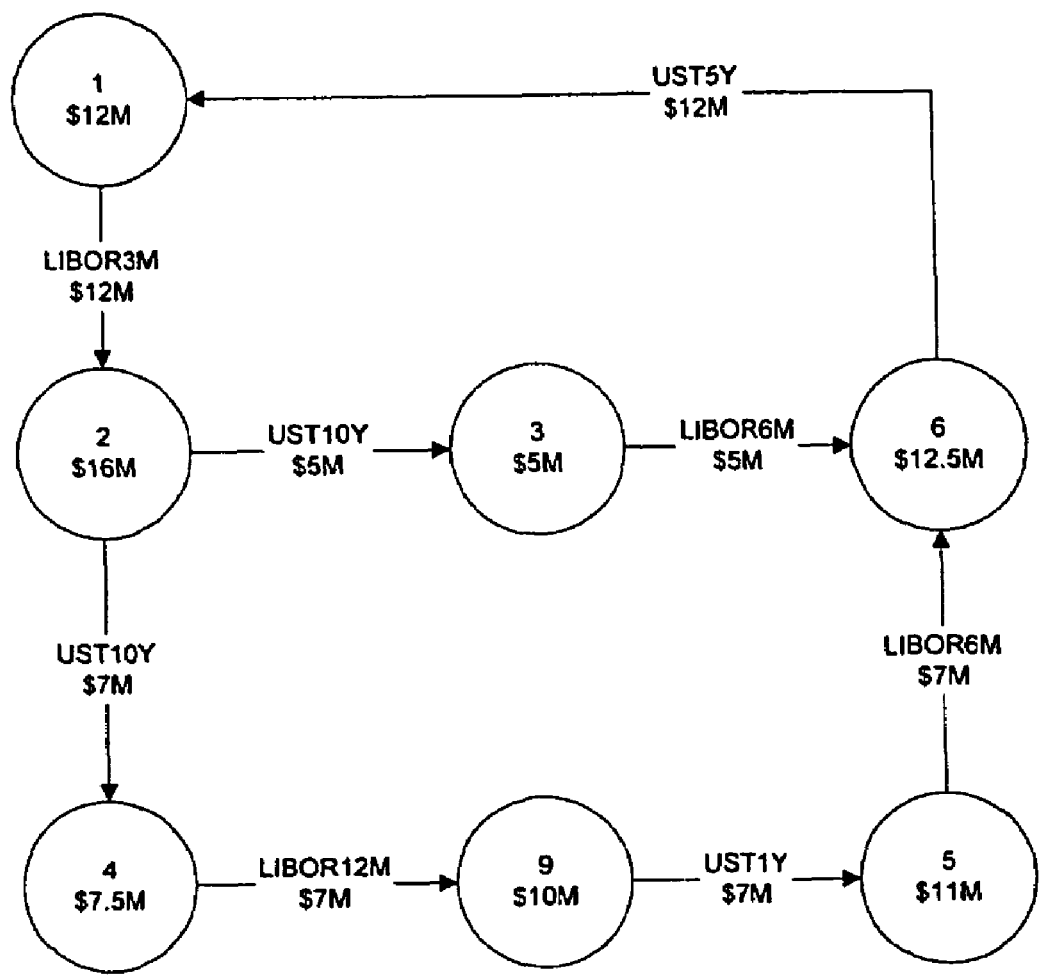
FIG. 22 schematically illustrates the underlying and notional amount for payments between parties determined from a maximal notional flow with respect to node 1 on the transaction diagram of FIG. 9 determined with the method of the example preferred embodiment.

When the method terminates, the notional flows x(i,j) determine a linear combination of transactions specifying payments that, perhaps subject to minor adjustments and spreads, net to zero. If the combination of transactions is consummated, each party to the combination will pay and receive the cash flows specified by the exchange definitions they specified, but with notional amounts specified by x(i,j). If the transactions are consummated directly between the parties, for each x(i,j)>0 in G, the party that specified a transaction represented by a node j will be paid by the party that specified the transaction represented by node i. The terms will be those of the transaction each party specified, except that notional amount will be x(i,j), which may be less than the amount originally specified. FIG. 22 schematically illustrates the underlying and notional amount for payments between parties determined from the x(i,j) in the example.

Because the combination of payments nets to zero, it is unnecessary for the parties to make payments directly to each other. A paying agent may be appointed to receive and pay out the payments according to the combination transaction. Absent default by any party, the paying agent will pay out the same amount in each payment period that it receives.

Figure 23:
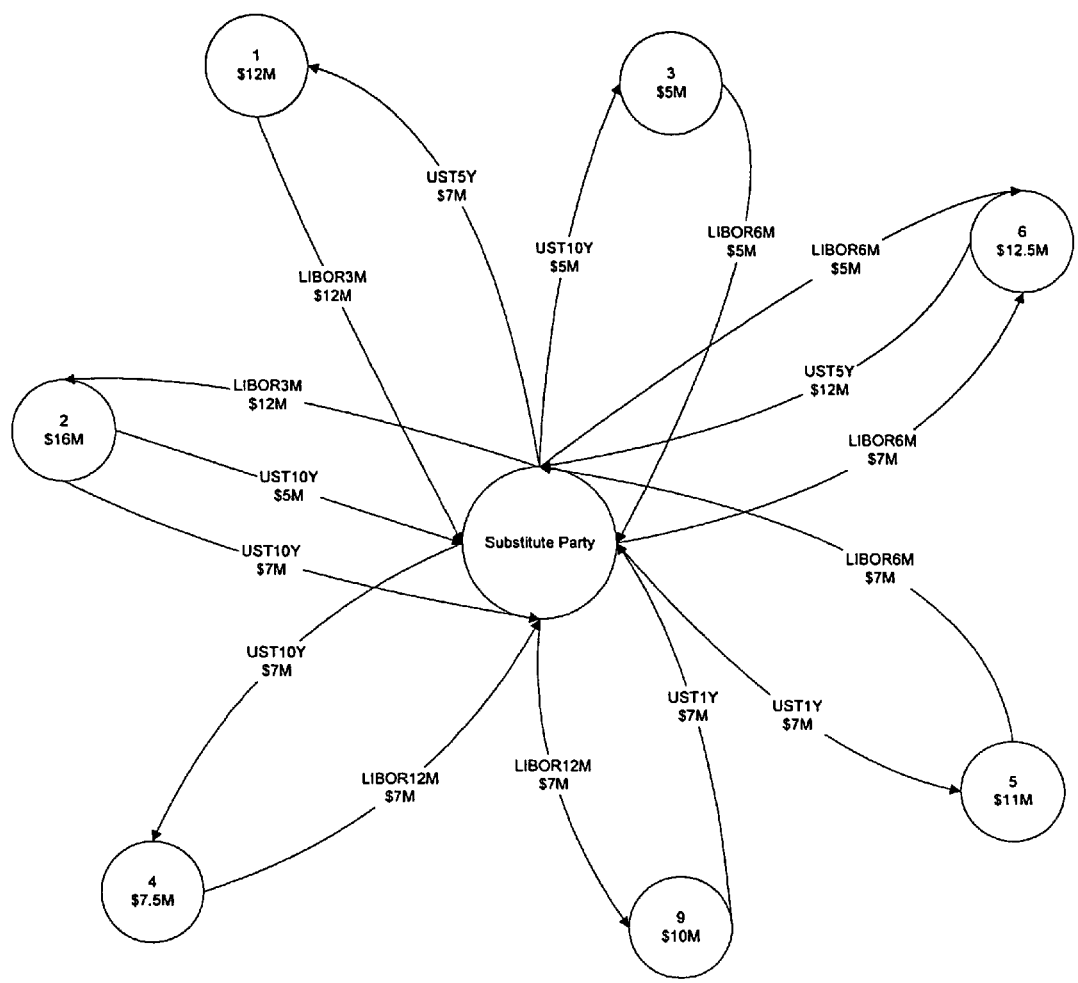
FIG. 23 schematically illustrates the underlying and notional amount for payments between parties and a fully hedged substitute party determined from FIG. 22.
Figure 24:
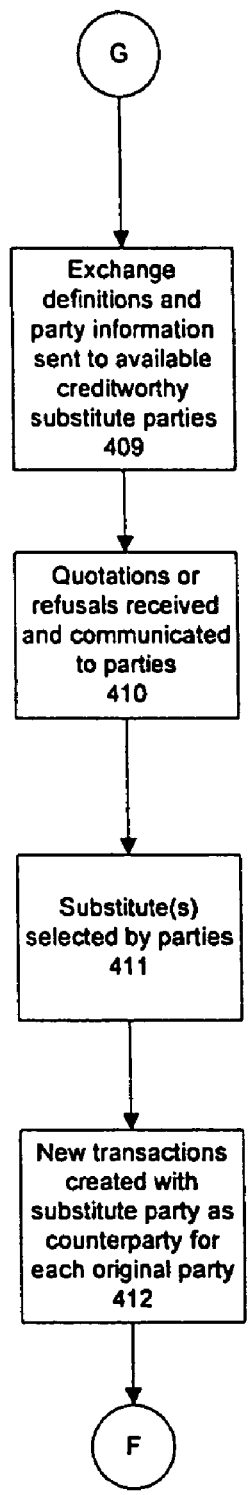
FIG. 24 is a flow chart schematically illustrating system function in an example preferred embodiment.

Moreover, because the linear combination of transactions is fully hedged, the parties need not deal with each other at all. A substitute party that is acceptable to all parties and willing to accept the credit risk of the parties may act as the counterparty to each of the parties of the combination. In this situation, the parties of the combination need never be identified to each other. Sufficient information for potential substitute parties to adequately assess the credit risks of acting as a substitute party is preferably provided to potential substitute parties in this case. FIG. 23 schematically illustrates the payments to and from a fully effectively hedged substitute party determined from linear combination of the example.

Referring again to FIG. 1, after determining the notional flows x(i,j) as described above, new exchange definitions are generated reflecting one or more mutiparty transactions having notional amounts equal to the nonzero flows x(i,j) 116. The new exchange definitions and associated party information is provided to the user in a result dataset and the user reviews the dataset 105 and proceeds as described above. Parties to such a synthetic transaction whose exchange definitions specified notional amounts larger than those reflected in the exchange definitions of the completed transactions are given the opportunity to use the system to locate transactions matching the balance of their original exchange definitions.

In a preferred embodiment, a synthetic combination is decomposed into separate multiparty transactions, one for each distinct circuit having positive notional flow in the solution graph G. Each such separate multiparty transaction may then be treated separately by the system, although parties on paths occurring in more than one such circuit would be provided with one transaction for each circuit on which they were represented.

System Architecture of an Exemplary Preferred Embodiment

Exchange definitions in a preferred embodiment are preferably instances of objects which may be described in a standard notation. For example, in a preferred embodiment, exchange definitions could be expressed in accordance with an object model translatable into Universal Modeling Language, Interface Definition Language for the Object Management Group's (OMG's) Common Object Request Broker Architecture (CORBA) and/or Java Remote Method Interface (RMI) and/or Microsoft Distributed Component Object Model (DCOM) Standardized General Markup Language (SGML) and/or Extensible Markup Language (UML). In one preferred embodiment, exchange definitions are translatable into UML in accordance with the Financial Products Markup Language (FpML) specification published by J.P. Morgan & Co. and PricewaterhouseCoopers.

The system transaction repository may be implemented as a database, such as a relational or object-oriented database. In a preferred embodiment, the transaction repository is implemented using persistent object oriented software components, and component transaction monitor, to provide atomicity, consistency, integrity, durability (ACID) and fine-grained security to system operations in a highly distributed environment The transaction repository is preferably distributed, both for redundancy and fail-safety and to provide the ability for users with substantial system activities to operate, maintain and control access to portions of the transaction repository containing transaction information relating to their own activities. Queries to remote portions of the transaction repository preferably may be mediated by a trader service, such as that specified the OMG CORBA Trader specification.

In one preferred embodiment, the transaction repository and related system logic is implemented in accordance with the Sun Microsystems Enterprise Java Bean (EJB) specification. In particular, exchange definitions are stored in the system as Java objects in accordance with the EntityBean class specified in the EJB specification.

Throughout this specification, portions of the system such as exchange definitions and other data elements and/or objects are described as being provided to other portions of the system (e.g., "passed", "returned," "received," or "sent"). Unless specified, such descriptions may refer to transfer of information by reference, by value, or either.

Security

In a preferred embodiment, users of the system authorized to solicit or commit to transactions are preregistered. The identity of users is preferably authenticated by the system using standard public key infrastructure (PKI) methods, such as digital certificates conforming to ITU X.509 issued to users by one or more certificate providers such as Verisign or Thawte Computing and verified by an SSL-enabled browser such as Netscape. Preferably, all PKI private signature components used in the system (by users and the servers) are stored in hardware security modules rated by the U.S. Government National Institute of Standards FIPS-140-1 such as are available from Spyrus.

The system is preferably operated on a trusted operating system meeting NIST FIPS 151 standards, such as trusted Solaris from Sun Microsystems. Mandatory access control is used to restrict access to authorized applications.

What is claimed is:

1. A computer system for matching structured cash flows for exchange comprising:
    one or more processors;
    a database of one or more exchange definitions;
    said one or more processors running a stored program code for retrieving from the database of one or more exchange definitions one or more exchange definitions comprising underlyings compatible with a first exchange definition, each exchange definition of the one or more exchange definitions comprising two or more underlyings, one or more notional amounts or notional ranges, and one or more payment provisions; and
    said one or more processors running a stored program code for determining a linear combination of partial exchange definitions such that the net present value of the cumulative cash flow of the linear combination of partial exchange definitions is substantially zero, each partial exchange definition comprising a portion of a notional amount of the corresponding exchange definition in the range of zero to one.

2. The computer system of claim 1, further configured not to identify a party or parties that provided the one or more exchange definitions to a party that provided the first exchange definition.

3. The computer system of claim 1, further comprising:
    stored program code for determining whether at least one creditworthy party is willing to act as counterparty in one or more partial transactions of the linear combination.

4. The computer system of claim 3, further comprising:
    stored program code for determining an amount that the creditworthy party would charge to act as counterparty for one or more partial transactions of the linear combination.

5. The computer system of claim 1, further comprising:
    stored program code for determining an amount specific to each party that the creditworthy party would charge to act as a counterparty.

6. The computer system of claim 1, wherein the first transaction definition corresponds to an interest-bearing asset or liability and the combined notional amount of the combination of exchanges matches the principal amount of the interest-bearing asset or liability.

7. The computer system of claim 1 wherein one formula for computing net settlements is used for each net settlement.

8. The computer system of claim 6 wherein the interest-bearing asset or liability is not prepayable.

9. A computer system for contracting to exchange structured cash flows comprising:
    a memory;
    database comprising a plurality of exchange definitions, each exchange definition comprising:
        an indication of a first underlying,
        an indication of a second underlying,
        an indication of a notional amount,
        an indication of a payment provision defining cash flows to be paid or received with respect to the notional amount and underlying;
    a processor running a transaction monitor providing atomicity, consistency, integrity and durability to operations on the database;
    said processor running a query system for searching the database for exchange definitions comprising specified underlyings; and
    said processor which accesses said memory and said database to determine a linear combination of partial exchange definitions such that the net present value of a cumulative cash flow of the linear combination of partial exchange definitions is substantially zero, each partial exchange definition comprising a portion of a notional amount of the corresponding exchange definition in the range of zero to one.

10. The system of claim 9, wherein in response to a query, the query system returns information sufficient for a user to communicate anonymously with the parties whose exchange definitions comprise the specified underlyings, but not sufficient to reveal the identities of those parties.

11. A digital memory coupled to a processor, wherein said digital memory storing program code for matching structured cash flows for exchange comprising:
    one or more digital memories storing program code, further comprising:
    program code for determining information corresponding to a linear combination of one or more partial exchange definitions such that the net present value of the cash flows of the linear combination of partial exchange definitions is substantially zero, each partial exchange definition comprising a portion of a notional amount of the exchange definition in the range of zero to one; and
    program code for determining information indicating, for each party that provided an exchange definition corresponding to a partial exchange definition of the linear combination, the portion of the party's exchange definition that comprises the corresponding partial exchange definition of the combination.

12. The computer system of claim 11, further comprising:
stored program code for determining whether at least one creditworthy party is willing to act as counterparty in at least one partial transaction of the combination.

13. The computer system of claim 12, further comprising:
digital memory storing program code for determining the amount that the at least one creditworthy party would charge to act as a counterparty in the at least one partial transaction of the combination.

14. The computer system of claim 13, wherein the information of the amount that the creditworthy party would charge to act as a counterparty in the at least one partial transaction of the combination comprises information of an amount specific to the corresponding party.

15. The computer system of claim 11, wherein the first transaction represents an interest-bearing asset or liability and the combined notional amount of the combination of exchanges matches the principal amount of the interest-bearing asset or liability.

16. The computer system of claim 11, wherein one formula for computing net settlements is used for each net settlement.

17. The computer system of claim 15, wherein the interest-bearing asset or liability is not prepayable.

\* \* \* \* \*